(12) United States Patent
Matsuo et al.

(10) Patent No.: US 6,448,694 B2
(45) Date of Patent: Sep. 10, 2002

(54) ACTUATOR AND DRIVING METHOD THEREOF

(75) Inventors: Takashi Matsuo, Itami; Masayuki Ueyama, Takarazuka; Hiroyuki Okada, Izumi; Kazuhiro Shibatani, Sakai; Shinya Matsuda, Takarazuka; Akira Kosaka, Yao, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/764,143

(22) Filed: Jan. 19, 2001

(30) Foreign Application Priority Data

Jan. 21, 2000 (JP) .................................. 2000-012568
Mar. 31, 2000 (JP) .................................. 2000-097091

(51) Int. Cl.$^7$ ................................................ H02N 2/00
(52) U.S. Cl. .............. 310/328; 310/323.03; 310/323.16
(58) Field of Search ................ 310/323.01–323.03, 310/323.16, 328, 329

(56) References Cited

U.S. PATENT DOCUMENTS

| | | | | |
|---|---|---|---|---|
| 4,613,782 A | * | 9/1986 | Mori et al. | 310/323.16 |
| 4,728,843 A | * | 3/1988 | Mishiro | 310/323.16 |
| 5,134,334 A | * | 7/1992 | Onishi et al. | 310/323.16 |
| 5,216,313 A | * | 6/1993 | Ohinishi et al. | 310/323.16 |
| 5,345,137 A | * | 9/1994 | Funakubo et al. | 310/323.16 |
| 5,656,769 A | * | 8/1997 | Nakano et al. | 73/105 |
| 6,064,140 A | * | 5/2000 | Zumeris | 310/316.01 |
| 6,201,340 B1 | * | 3/2001 | Matsuda et al. | 310/328 |
| 6,242,850 B1 | * | 6/2001 | Slutskiy et al. | 310/328 |

FOREIGN PATENT DOCUMENTS

| | | | |
|---|---|---|---|
| JP | 58-148682 | 9/1983 | H02N/11/00 |
| JP | 6-36673 | 5/1994 | H02N/2/00 |
| JP | 7-114550 | 12/1995 | H02N/2/00 |

* cited by examiner

Primary Examiner—Thomas M. Dougherty
(74) Attorney, Agent, or Firm—McDermott, Will & Emery

(57) ABSTRACT

An actuator includes at least two piezoelectric devices arranged for crossing displacing directions thereof at a predetermined angle, a chip member provided at a coupling point of the piezoelectric devices, and a spring for contacting the chip member to a rotor driven by the actuator. The piezoelectric device is driven for moving the chip member trailing an elliptical trail. The rotation velocity or the driving torque of the rotor is controlled by varying at least one of a length of a major axis or a minor axis of the elliptical trail and an inclination angle of the major axis or the minor axis with respect to a normal at a contacting point of the chip member and the rotor.

23 Claims, 26 Drawing Sheets

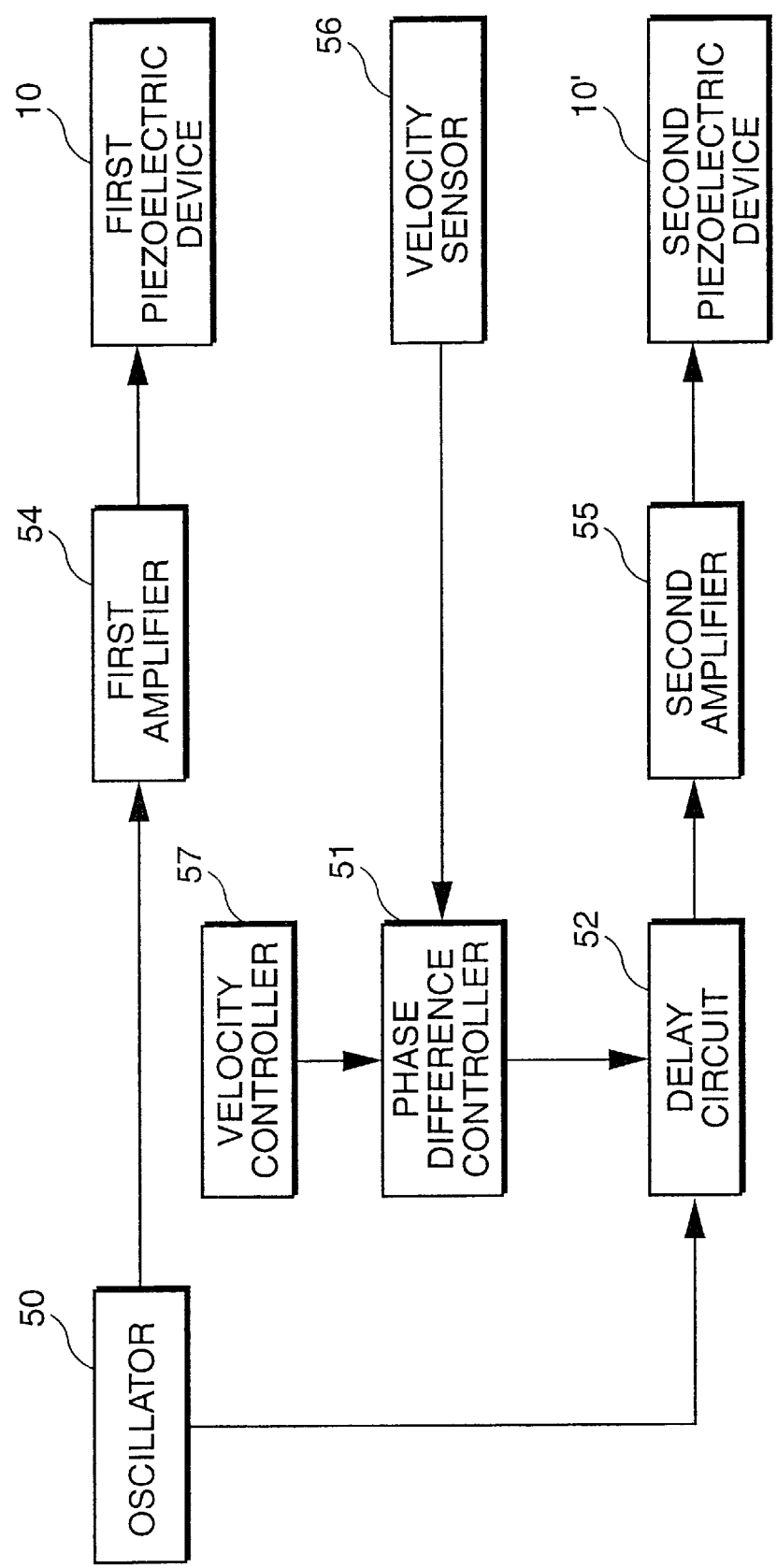

PHASE DIFFERENCE 60°

PHASE DIFFERENCE 120°

FIG. 13A 60°
FIG. 13B 90°
FIG. 13C 120°
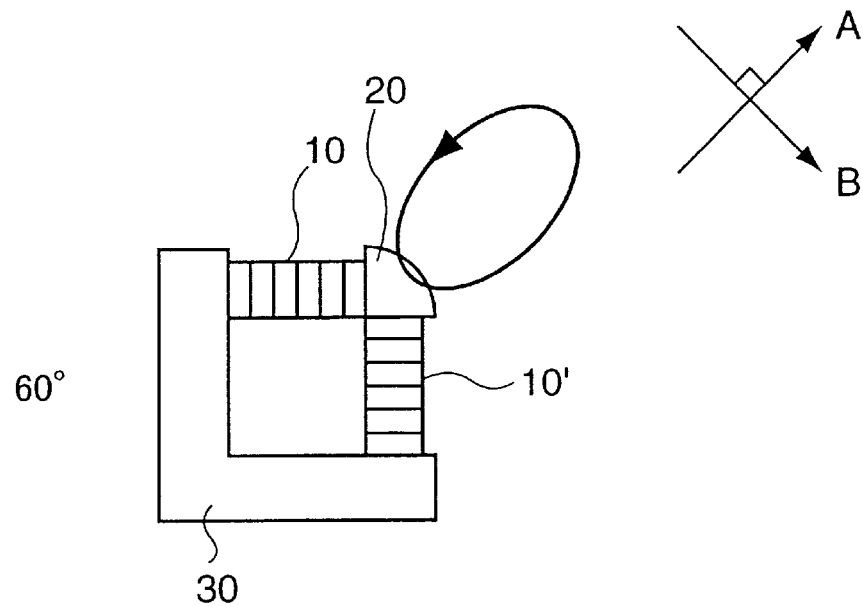
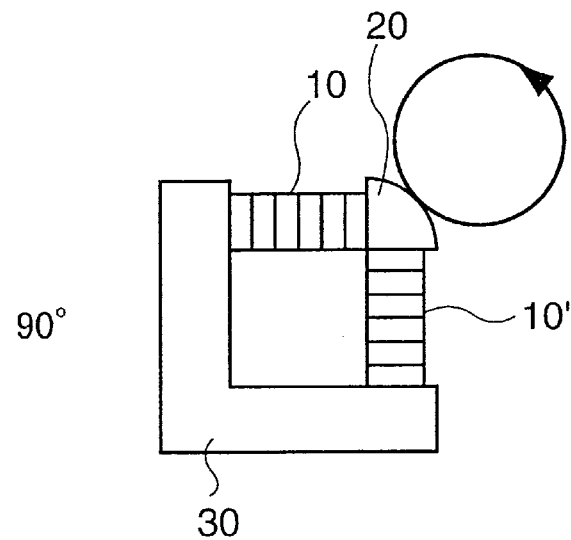
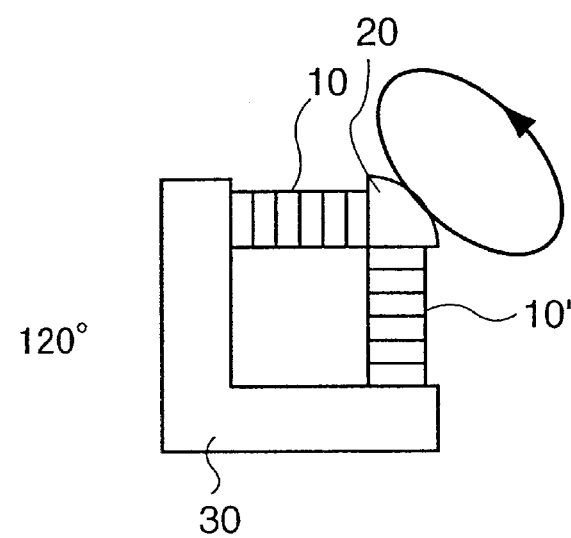

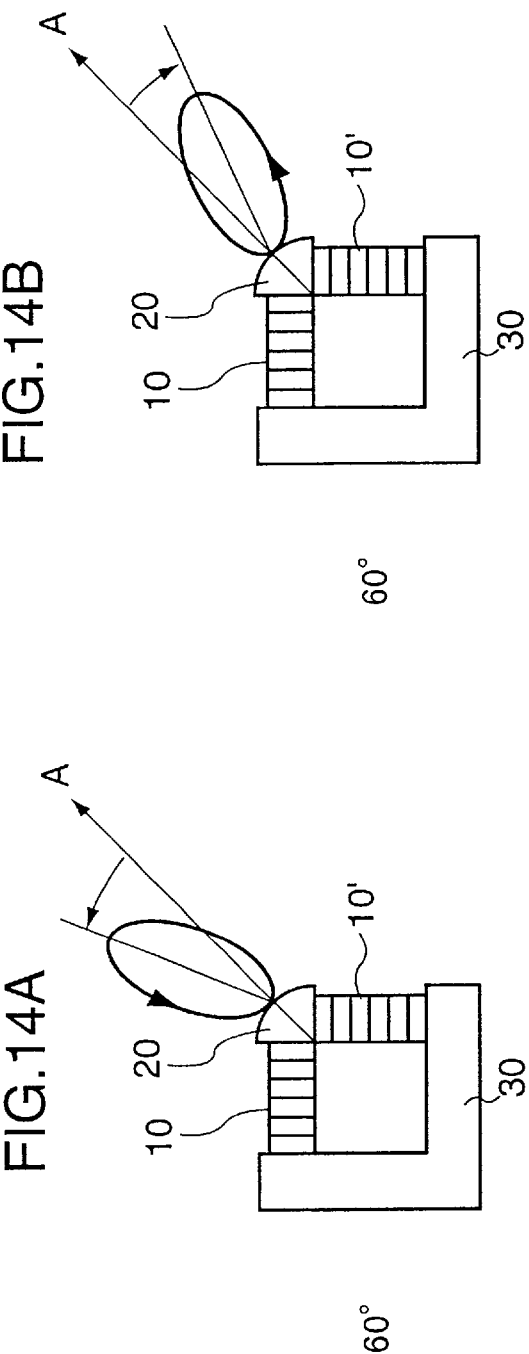
FIG.14A
60°
FIG.14B
60°
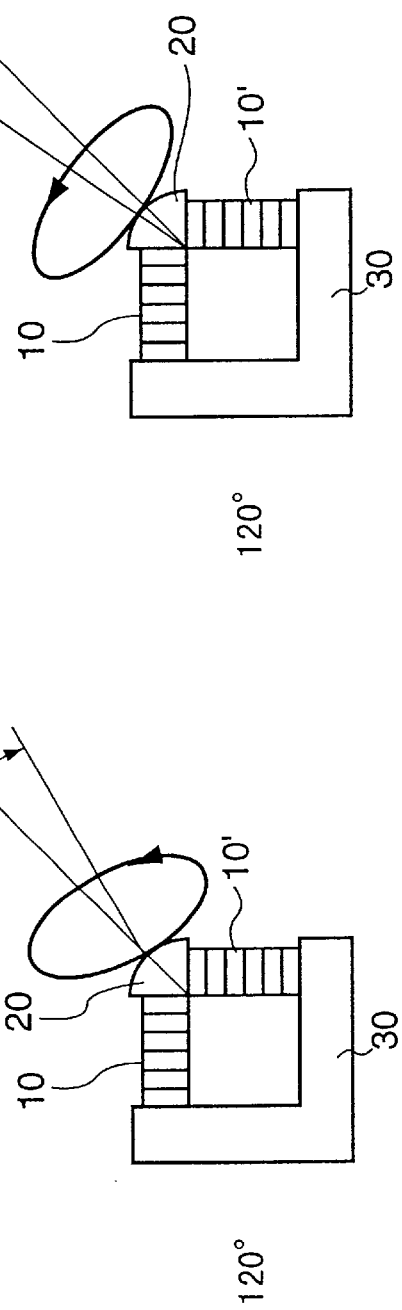
FIG.14C
120°
FIG.14D
120°

OPPOSITE PHASE

SAME PHASE

ACTUATOR AND DRIVING METHOD THEREOF

This application is based on patent applications 2000-012568 and 2000-097091 filed in Japan, the contents of which are hereby incorporated by references.

BACKGROUND OF THE INVENTION

1. Field of the Invention

The present invention relates to an actuator and a driving method thereof for moving a driven object such as a rotor or a rod by intermittently contacting a driving member to the driven object, in which the driving member is moved for trailing a circular or an elliptical trail by utilizing vibrations of at least one of a plurality of displacing elements such as piezoelectric devices.

2. Description of the Related Art

In recent years, a truss-type actuator is proposed for rotating or moving a driven object in a predetermined direction. In the truss-type actuator, two displacing elements such as piezoelectric devices are arranged to cross the displacing directions thereof at a predetermined angle such as 90 degrees. The displacing elements are respectively driven by alternating voltage signals having a predetermined phase difference so that a driving member provided at a crossing point of the displacing elements is moved for trailing a circular or an elliptical trail. When the driving member is intermittently contacted with the driven object, the driven object is rotated or moved in the predetermined direction by a friction force acting between the driving member and the driven object.

When sinusoidal voltage signals respectively having different phases are applied two piezoelectric devices, the piezoelectric devices respectively repeat expansion and contraction, so that they sinusoidally displace corresponding to the phase of the driving voltages. Thus, a chip member serving as a driving member coupled to the piezoelectric devices is moved for trailing an elliptical trail. When the phase difference of the sinusoidal displacements of the piezoelectric devices is 90 degrees, the chip member is moved for trailing a circular trail.

When the chip member is moved circularly or elliptically, the chip member is intermittently contacted with a rotor serving as a driven object. The rotor follows the movement of the chip member by a friction force acting between the chip member and the rotor while the chip member is contacted with the rotor, so that the rotor is intermittently rotated in a predetermine direction. By repeating these motions, a power of the actuator can be outputted via the rotation of the rotor.

For controlling the rotation velocity of the rotor, it is proposed to vary at least one of a frequency, a voltage and a phase difference of driving signals (sinusoidal voltage signals) applied to the piezoelectric devices. In a first conventional actuator shown in Publication Gazette of Examined Japanese Patent application Hei 7-114550, a velocity of a driven object is controlled by switching between a first velocity control for varying a voltage of driving signals applied to piezoelectric devices and a second velocity control for varying a frequency of the driving signals corresponding to a desired velocity of the driven object. The first conventional actuator, however, has a disadvantage that a variation of an electric power consumption is larger and a burden of an electric power supply becomes larger, since the moving velocity of the driven object is controlled by varying the voltage or the frequency of the driving signals.

In a second conventional truss-type actuator shown in Publication Gazette of Examined Japanese Patent application Hei 6-36673, a phase difference between two driving signals applied to two piezoelectric devices is fixed to be 120 degrees, and the piezoelectric devices are driven in a manner so that a chip member is moved to trail a compressed elliptical trail for increasing a moving velocity and a torque of a driven object. The second conventional actuator, however, has a disadvantage that the moving velocity varies corresponding to variation of a load of the actuator, since the phase difference of the driving signals is fixed.

SUMMERY OF THE INVENTION

A purpose of the present invention is to provide an actuator and a driving method thereof in which the moving velocity and the torque of the driven object can be controlled to be desired values even though the electric power consumption of the actuator is substantially constant.

An actuator in accordance with the present invention comprises: a base member; a plurality of displacing elements for generating a predetermined displacement, in which top ends of them are coupled at one point and base ends of them are respectively fixed on the base member; a pressing member for contacting the coupled top ends of the displacing elements to a driven object with a predetermined pressure; a driving circuit for applying at least one driving signal to at least one displacing elements; and a controller for controlling the driving signal so that the coupled top ends of the displacing elements moves for trailing an elliptical trail; wherein the controller controls the driving signal in a manner so that shape of the elliptical trail of the coupled top ends of the displacing elements is varied.

By such a configuration, a velocity or a torque of the driven object can be varied corresponding to the shape of the elliptical trail of the coupled top ends of the displacing elements. More concretely, a diameter of the elliptical trail in the tangential direction at the contacting point of the coupled top ends of the displacing elements and the driven object influences to the velocity of the driven object, and a diameter of the elliptical trail in the normal direction influences to the torque or driving force of the driven object. Thus, it is possible to make the velocity of the driven object faster by enlarging the diameter of the elliptical trail in the tangential direction, and to make the torque of the driven object stronger by enlarging the diameter of the elliptical train in the normal direction, and vice versa.

BRIEF DESCRIPTION OF THE DRAWINGS

FIG. 4 is a block diagram for showing a configuration of a driving circuit of the actuator in the first embodiment;

FIGS. 13A to 13C are front views respectively for showing trails of a chip member when a phase difference of driving signals applied to piezoelectric devices is varied in a fourth embodiment of the present invention;

FIGS. 14A to 14D are front views respectively for showing the trails of the chip member when not only the phase difference but also amplitudes of the driving signals applied to the piezoelectric devices are varied in the fourth embodiment;

DETAILED DESCRIPTION OF THE EMBODIMENT

FIRST EMBODIMENT

Figure 1:
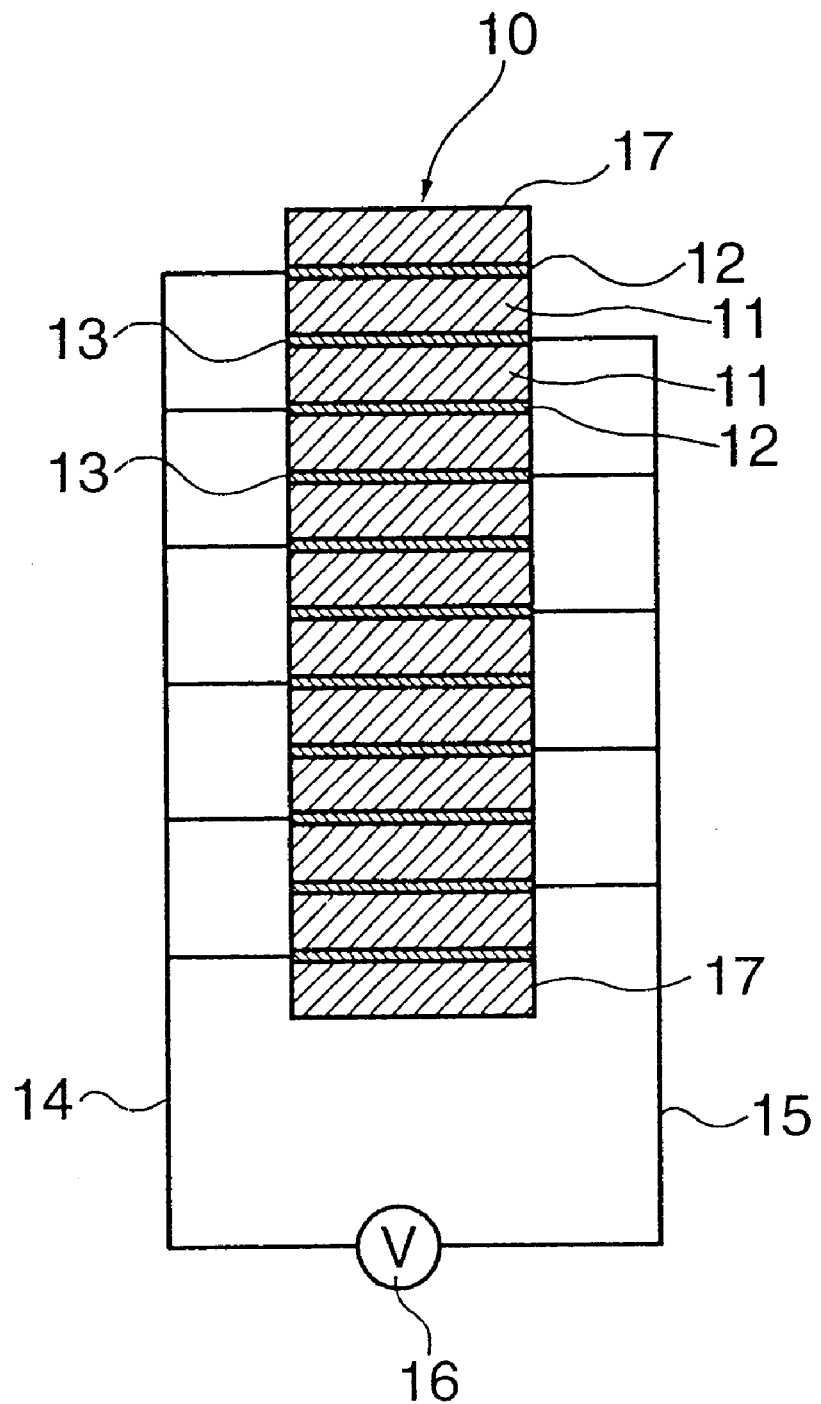
FIG. 1 is a front view showing a configuration of a lamination type piezoelectric device used as a displacing device in embodiments of the present invention.

A first embodiment of an actuator in accordance with the present invention is described. A configuration of a lamination type piezoelectric device used as a displacing device in the following embodiments is shown in FIG. 1. The lamination type piezoelectric device 10 is formed by piling up of a plurality of ceramic thin plates 11 and electrodes 12 and 13 alternately disposed. The ceramic thin plates 11 is made of such as PZT showing piezoelectric characteristic. The ceramic thin plates 11 and the electrodes 12 and 13 are fixed by an adhesive. Two groups of electrodes 12 and 13 which are alternately disposed are respectively connected to a driving power source 16 via cables 14 and 15. When a predetermined voltage is applied between the cables 14 and 15, an electric field is generated in each ceramic thin plate 11 disposed between the electrodes 12 and 13. The direction of the electric field in the ceramic thin plates alternately disposed is the same. Thus, the ceramic thin plates 11 are piled in a manner so that polarization direction of the ceramic thin plates 11 alternately disposed becomes the same. In other words, the polarization directions of adjoining two ceramic thin plates are opposite to each other. Furthermore, protection layers 17 are provided on both ends of the piezoelectric device 10.

Figure 2:
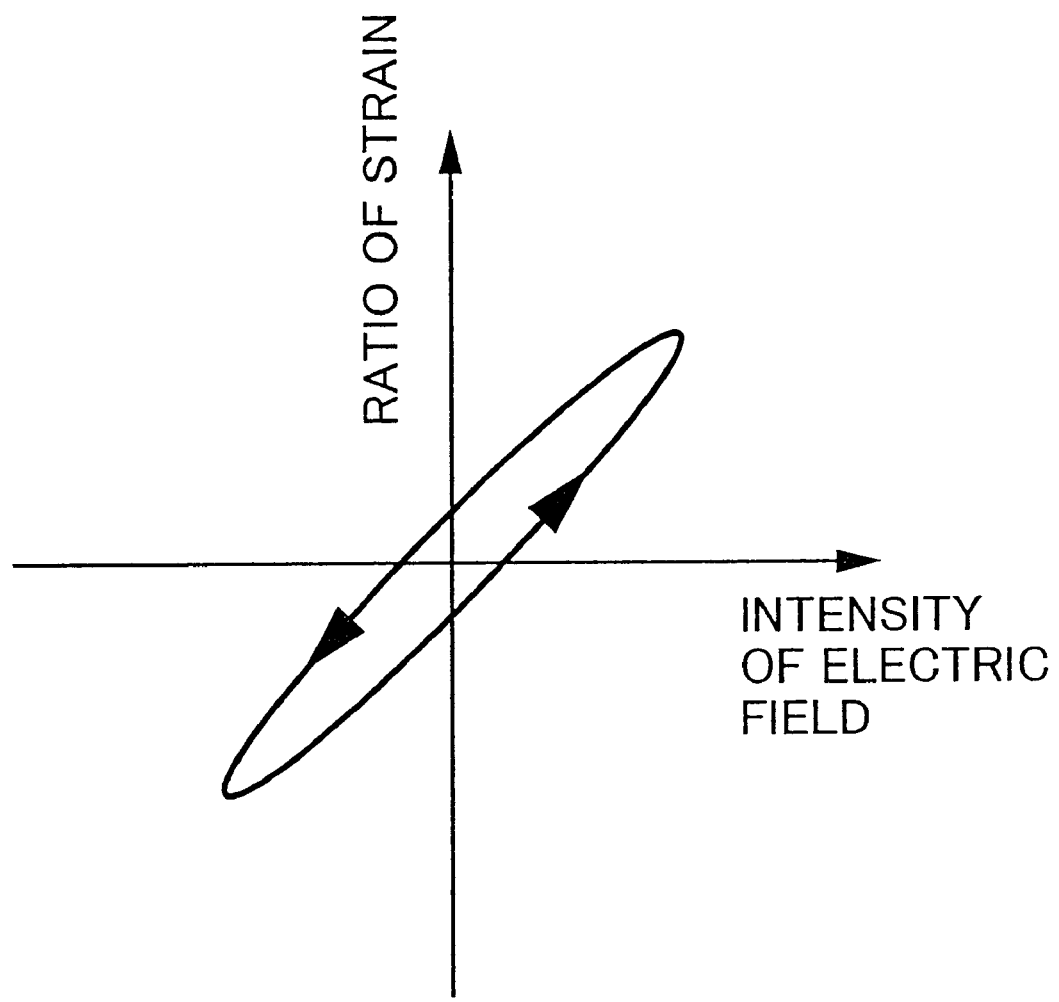
FIG. 2 is a graph for showing a relation between displacement of a piezoelectric device and electric field applied to the piezoelectric device.

When a DC driving voltage is applied between the electrodes 12 and 13, each ceramic thin plate 11 expands or contracts in the same direction. Thus, whole the piezoelectric device 10 can expand and contract. When the electric field in the ceramic thin plate 11 is sufficiently small and hysteresis of the displacement of the ceramic thin plate 11 can be ignored, it is possible to consider that a relation between the displacement of the piezoelectric device 10 and the electric field generated between the electrodes 12 and 13 is linear. The relation between the displacement of the piezoelectric device and the electric field is shown in FIG. 2. In FIG. 2, the abscissa shows the intensity of electric field and the ordinate shows the ratio of strain of the piezoelectric device.

When an AC driving voltage (signal) is applied between the electrodes 12 and 13 by the driving power source 16, all the ceramic thin plates 11 repeat the expansion and the contraction in the same direction corresponding to the intensity of the electric fields. As a result, the piezoelectric device 10 can repeat the expansion and the contraction. The piezoelectric device 10 has an inherent resonance frequency defined by the configuration and the electric characteristics thereof. When the frequency of the AC driving voltage coincides with the resonance frequency of the piezoelectric device 10, the impedance of the piezoelectric device 10 is reduced and the displacement thereof increases. Since the displacement of the piezoelectric device 10 is small with respect to the size thereof, it is preferable to utilize the resonance phenomenon for driving the piezoelectric device by a low driving voltage.

Figure 3:
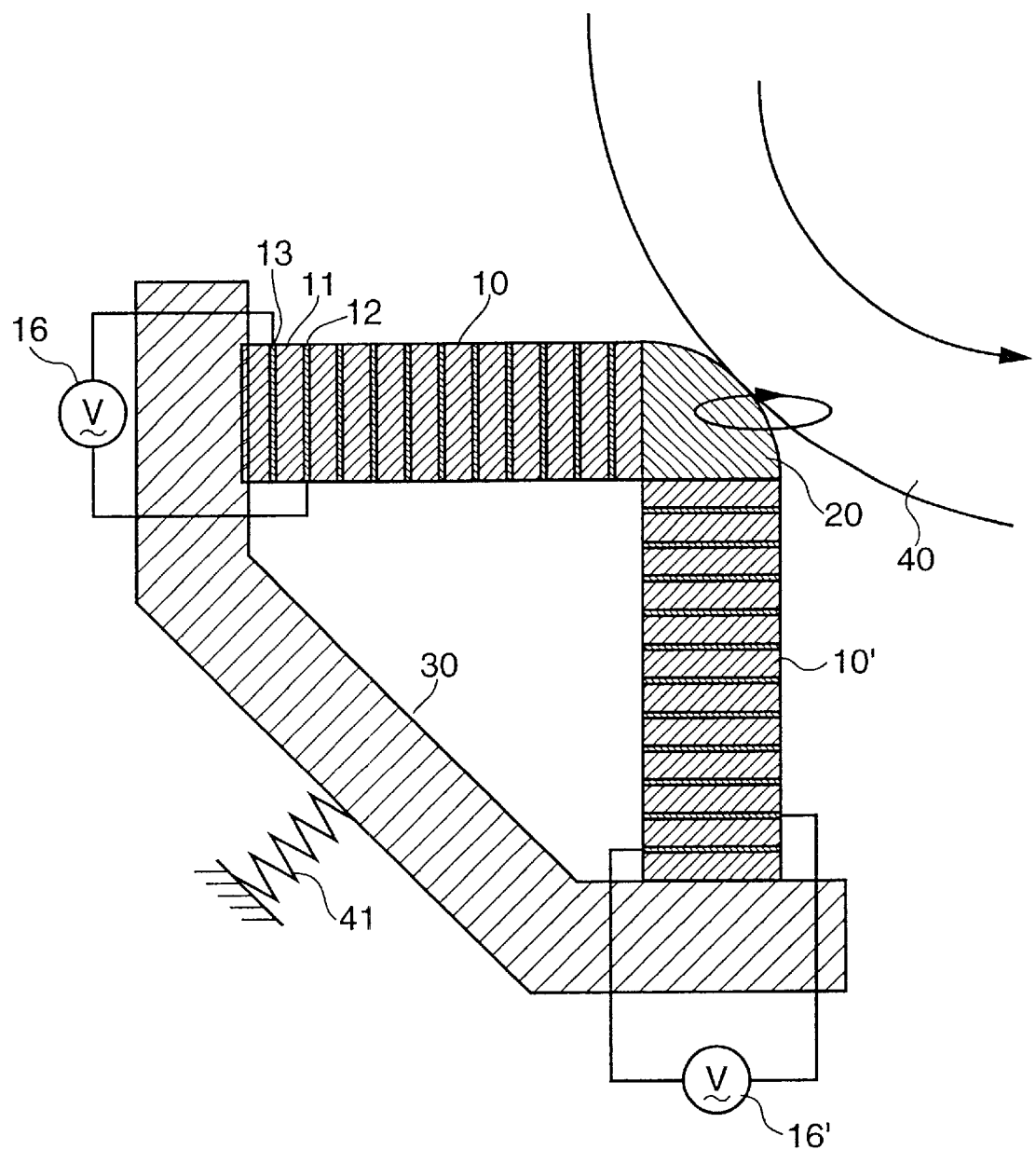
FIG. 3 is front view for showing a configuration of an actuator in the first embodiment.

A configuration of a truss type actuator in the first embodiment is shown in FIG. 3. A first piezoelectric device 10 and a second piezoelectric device 10' serving as displacing devices are disposed to cross substantially at right angle. A chip member 20 serving as a compound member for compounding the displacements of the first piezoelectric device 10 and the second piezoelectric device 10' is disposed at crossing point and connected on respective top ends of the first piezoelectric device 10 and the second piezoelectric device 10' by an adhesive. Base ends of the first piezoelectric device 10 and the second piezoelectric device 10' are respectively fixed on a base member 30 by an adhesive. As a material of the chip member 20, it is preferable to use a material such as tungsten having high friction factor and high wear resistance. As a material of the base member 30, it is preferable to use a material such as stainless steel having high workability and strength. As a material of the adhesive, it is preferable to use a material such as epoxy resin having high adhesive strength. The first piezoelectric device 10 and the second piezoelectric device 10' are substantially the same as the piezoelectric device 10 shown in FIG. 1. Elements for constituting the second piezoelectric device 10' are distinguished from those of the first piezoelectric device 10 by adding (') to the numerals.

In this actuator, the first piezoelectric device 10 and the second piezoelectric device 10' are respectively driven by AC driving signals having a predetermined phase difference, so that the chip member 20 can be moved elliptically or circularly. When the chip member 20 is pushed on, for example, a cylindrical surface of a rotor 40 which can rotate around a predetermined axis, the elliptic or circular movement of the chip member 20 can be converted to the rotation of the rotor 40. Alternatively, when the chip member 20 is pushed on a plane surface of a rod shaped member (not shown), the elliptic or circular movement of the chip member 20 can be converted to a rectilinear motion of the rod shaped member. As a material of the rotor 40, it is preferable to use a material such as aluminum having a light weight. Furthermore, it is preferable to form an anodic oxide coating on the surface of the rotor 40 for preventing the wear due to the friction between the chip member 20 and the rotor 40.

When two independent movements crossing at right angle are compounded, the crossing point moves along an elliptic trail including the circular trail defined by the Lissajous' equation. In the actuator of the first embodiment, it is possible to control the rotation direction, the rotation velocity and the torque of the rotor 40 by controlling the trail of the chip member 20. More concretely, when the diameter of the trail of the chip member 20 in the tangential direction of the rotor 40 is enlarged, the rotation velocity of the rotor 40 can be increased. Alternatively, when the diameter of the trail of the chip member 20 in the normal direction of the rotor 40 is enlarged, the torque of the rotor 40 can be increased. When the phase difference between the driving signals for the first piezoelectric device 10 and the second piezoelectric device 10' are reversed, the rotation direction of the rotor 40 can be reversed.

A block diagram of a driving circuit is shown in FIG. 4. An oscillator 50 generates a sinusoidal signal having a predetermined frequency coinciding with resonance frequencies of the first piezoelectric device 10 and the second piezoelectric device 10'. A velocity sensor 56 such as a pulse encoder or a magneto-resistive device senses a rotation velocity of the rotor 40 and outputs the sensed result to a phase difference controller 51. The phase difference controller 51 compares the actual rotation velocity of the rotor 40 inputted from the velocity sensor 56 with a desires rotation velocity inputted from a velocity controller 57 such as a computer for controlling the actuator, calculates the most suitable phase difference between two driving signals respectively applied to the first and second piezoelectric devices 10 and 10', and controls a delay circuit 52 corresponding to the calculated result. The delay circuit 52 generates a sinusoidal signal having a predetermined phase difference with the sinusoidal driving signal from the oscillator 50. A first amplifier 54 amplifies the sinusoidal driving signal from the oscillator 50. A second amplifier 55 amplifies the sinusoidal driving signal from the delay circuit 52. The amplified sinusoidal signals amplified by the first amplifier 54 and the second amplifier 55 are respectively applied to the first piezoelectric device 10 and the second piezoelectric device 10'.

When the frequency of the sinusoidal voltage signals applied to the first piezoelectric device 10 and the second piezoelectric device 10' is larger than a predetermined value, and the rotation velocity of the chip member 20 becomes faster than a predetermined velocity, the actuator cannot follow the movement of the chip member 20 by a pressing force of a spring 41 for pressing the actuator to the rotor 40, so that the chip member 20 instantaneously is detached from the rotor 40. In other words, the chip member 20 is intermittently contacted with the rotor 40. The chip member 20 is moved in a predetermined direction while the chip member 20 is detached from the rotor 40, and the chip member 20 is moved in the opposite direction while the chip member 20 is contacted with the rotor 40, so that the rotor 40 can be rotated.

On the other hand, when the displacement of the first and second piezoelectric actuators 10 and 10' are sufficiently small, and the displacement of the chip member 20 becomes smaller than several $\mu$m, it is found that the chip member 20 and the rotor 40 always contact each other by elasticity of the materials of them. In the latter case, the rotor 40 is elastically deformed by the pressure of the spring, 41 and the chip member 20 is put into the deformed portion of the rotor 40, so that the chip member 20 is moved for trailing an elliptical trail under a condition that the chip member 20 is always contacted with the rotor 40. Thus, the movement of the rotor 40 is decelerated by the friction force acting between the rotor 40 and the chip member 20, so that the output power of the actuator is reduced. This phenomenon is notable when the pressure of the spring 41 is increased. When the elliptical trail of the chip member 20 is completely included in the deformed portion of the rotor 40, a start-up force corresponding to a start-up torque of the actuator becomes constant with no relation to the pressing force of the spring 41.

The actuator shown in FIG. 3 was actually manufactured, and contacting condition of the chip member 20 with the rotor 40 and output characteristics of the actuator with respect to the pressure of the spring 41 were measured.

Figure 6:
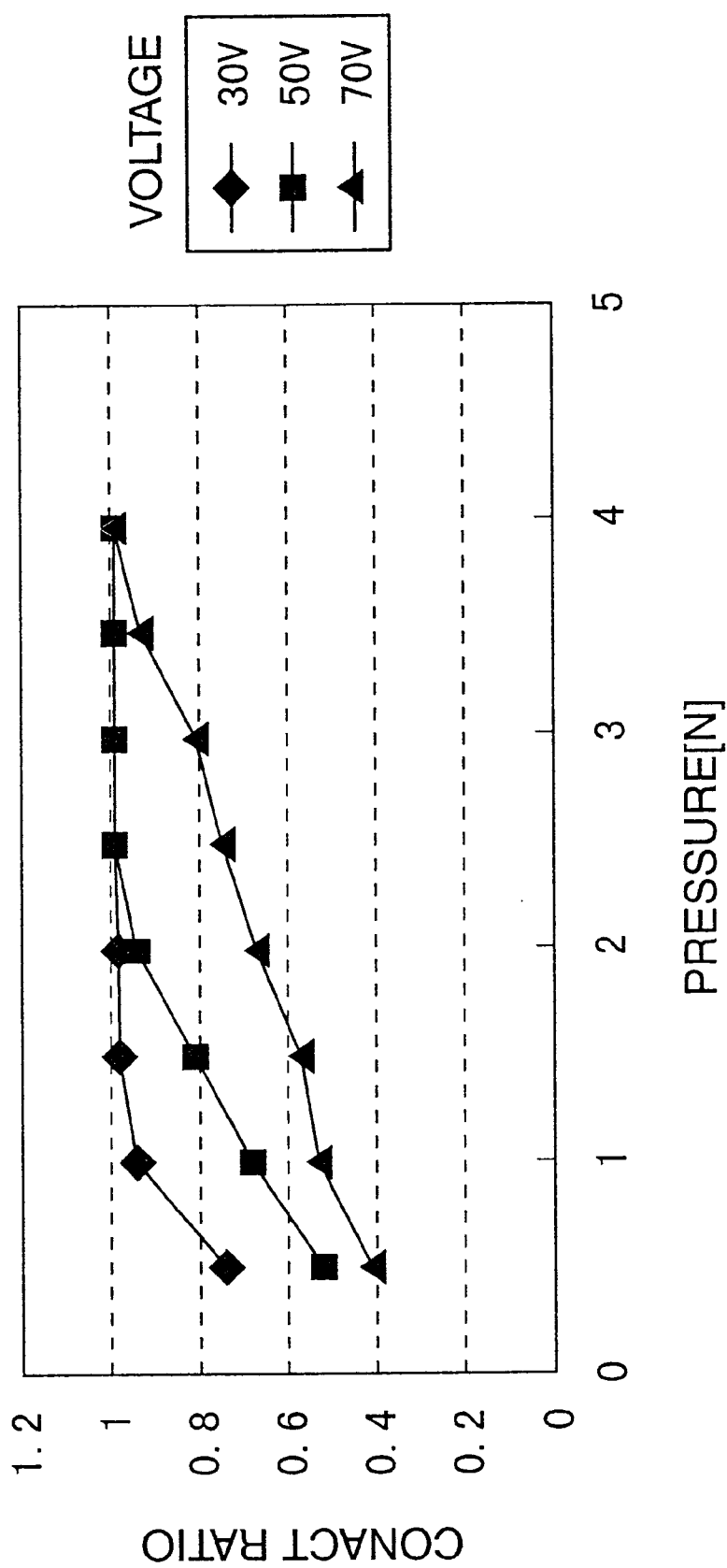
FIG. 6 is a graph for showing characteristic curves of relations between contact ratios of the chip member and a rotor serving as a driven object and pressures of a spring for pressing the chip member to the rotor with respect to voltages of the driving signals applied to piezoelectric devices in the first embodiment.

FIG. 6 shows a relation between the contact ratio of the chip member 20 with the rotor 40 and the pressure of the spring 41. When the voltage or amplitude of the driving signal was 70V, the contact ration of the chip member 20 with the rotor 40 was substantially in proportion to the pressure of the spring 41. It was considered that the displacements of the piezoelectric devices 10 and 10' were larger when the voltage is 70V, and the elastic deformations of the chip member 20 and the rotor 40 due to the reaction force of the pressure of the spring 41 was smaller than a diameter of the trail of the chip member 20 in the normal direction, so that the chip member 20 could completely be detached from the rotor 40. By the way, the larger the pressure of the spring 41 became, the larger the elastic deformations of the chip member 20 and the rotor 40 became. However, the diameter of the trail of the chip member 20 was constant, so that the time period while the chip member 20 was detached from the rotor 40 became shorter.

When the voltage was 50V or 30V, the displacements of the piezoelectric devices 10 and 10' were smaller, and the diameter of the trail of the chip member 20 was smaller. The elastic deformations of the chip member 20 and the rotor 40 due to the pressure of the spring 41, however, were constant, so that it was considered that the chip member 20 could always be contacted with the rotor 40 even when the pressure of the spring 41 was smaller. In comparison with both cases, the displacements of the piezoelectric devices 10 and 10' under 30V of the voltage of the driving signal was smaller than those under 50V, so that a region of the pressure of the spring 41 under 30V, where the rotor 20 was always contacted with the rotor 40, was wider than that under 50V In case that the voltage was 50V, it was found that a transition point between the first condition where the chip member 20 was intermittently contacted with and the rotor 40 and the second condition where the chip member 20 was always contacted with and the rotor 40 was existed in the vicinity of the point of the pressure of 2.5N.

Figure 7:
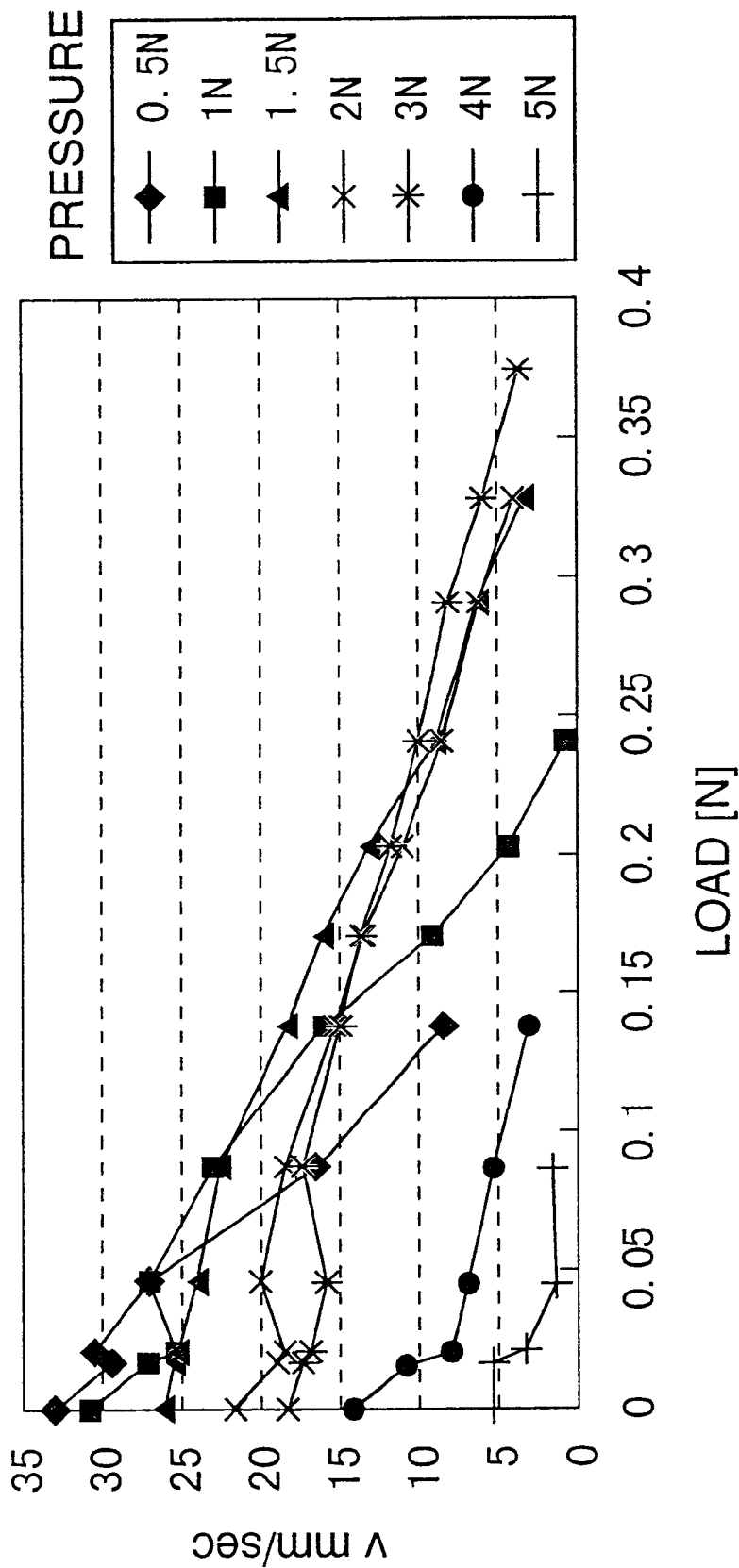
FIG. 7 is a graph for showing characteristic curves of relations between rotation velocities of the rotor and loads of the actuator with respect to the pressure of the spring in the first embodiment.

Furthermore, a characteristic between load and velocity of the rotor 40 was measured under a condition that the voltage, the frequency and the phase difference of the driving signals of the piezoelectric devices 10 and 10' were respectively fixed to be 50V, 25kHz and 90 degrees, and pressure of the spring 41 was varied from 0.5N to 5N. FIG. 7 shows the measurement results of the load-velocity characteristics.

When the ordinate of FIG. 7 was noticed, it was found that the velocity V of the rotor with no-load was gradually reduced corresponding to the increase of the pressure of the spring 41. When the characteristic curves of 0.5N, 1N, 1.5N and 2N corresponding to the above-mentioned first condition, where the chip member 20 was intermittently contacted with the rotor 40, were noticed, it was found that the friction force acting between the chip member 20 and the rotor 40 was increased corresponding to the increase of the pressure of the spring 41, so that the start-up force corresponding to the start-up torque of the actuator was increased.

On the other hand, when the characteristic curves of 3N, 4N and 5N corresponding to the above-mentioned second condition, where the chip member 20 was always contacted with the rotor 40, were noticed, it was found that the friction force acting between the chip member 20 and the rotor 40 was increased corresponding to the increase of the pressure of the spring 41, so that not only the start-up force (torque) of the actuator but also the deceleration force were increased. Since the voltage of the driving signal was fixed to be 50V, the amplitude of the displacements of the piezoelectric devices 10 and 10' was constant. Thus, a difference between the acceleration force and the deceleration force which corresponds to the torque became substantially constant. The rotation velocity of the rotor 40, however, was decreased corresponding to the increase of the pressure of the spring 41, so that the output power of the actuator was decreased, consequently.

Figure 8:
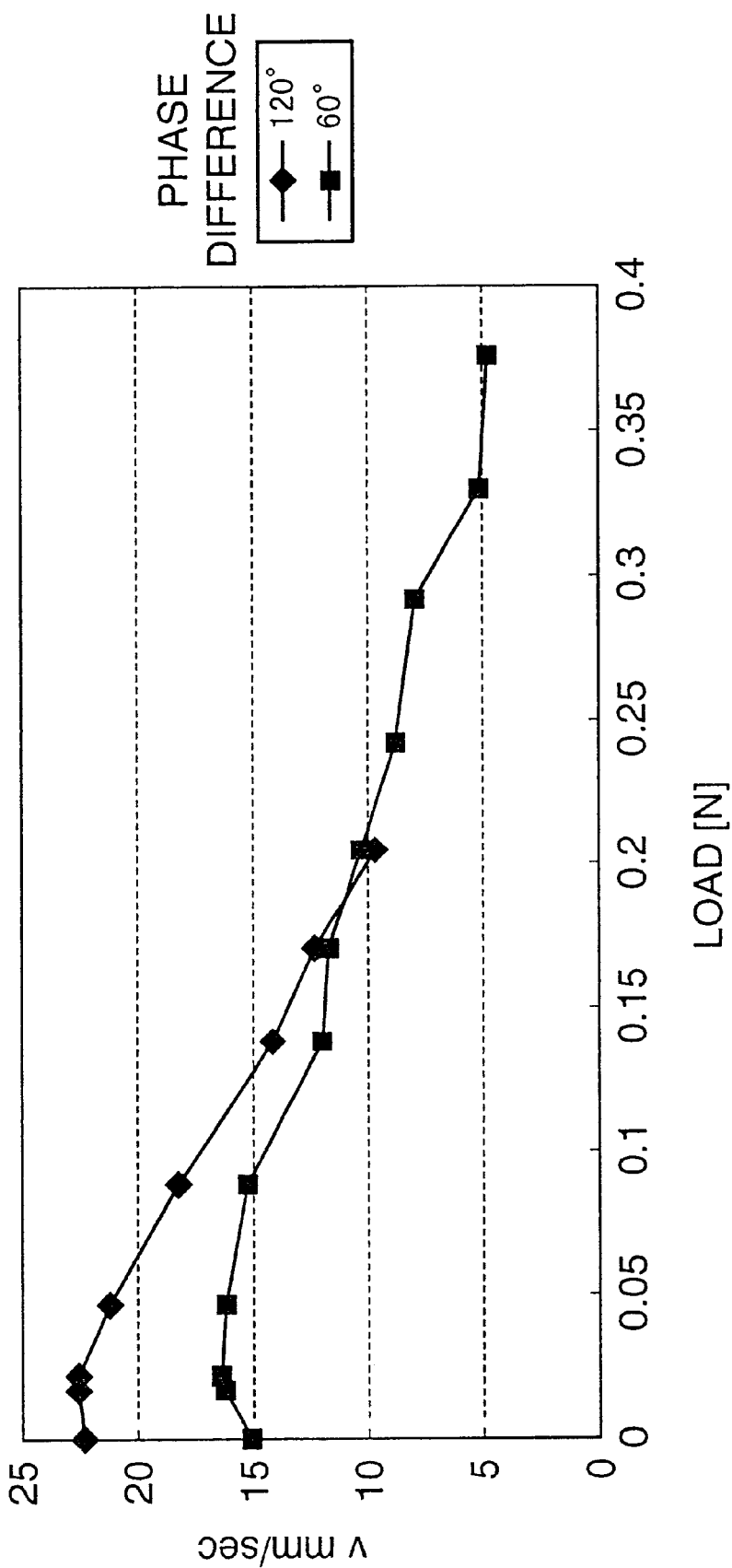
FIG. 8 is a graph for showing characteristic curves of relations between rotation velocities of the rotor and loads of the actuator with respect to a phase difference of driving signals in the first embodiment.

FIG. 8 shows the load-velocity characteristics of the rotor 40 when the phase difference between the driving signals 40 was set to be 60 degrees and 120 degrees and the other conditions were the same as those in the above-mentioned case. The trails of the chip member 20 are shown in FIGS. 5A and 5B.

Figure 5A:
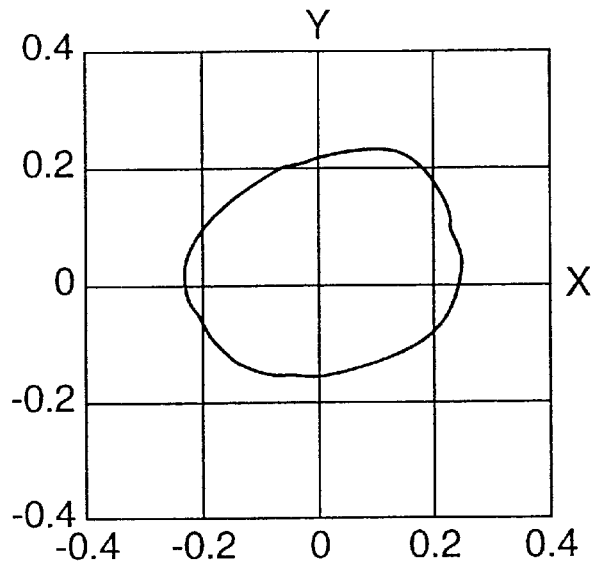
FIG. 5A is a graph for showing an example of a trail of movement of a chip member serving as a driving member in the first embodiment.
Figure 5B:
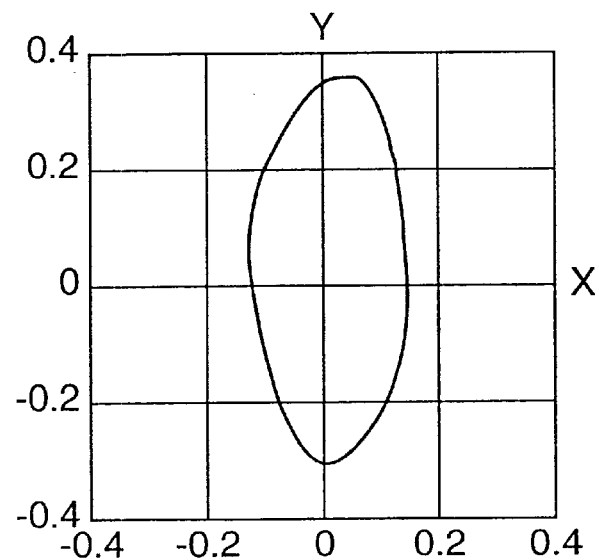
FIG. 5B is a graph for showing another example of the trail of movement of the chip member in the first embodiment.

As can be seen from FIGS. 5A and 5B, when the phase difference between the driving signals was made smaller, the trail of the chip member 20 became elliptical where the diameter in the normal direction at the contacting point of the chip member 20 with the rotor 40 was longer than that in the tangential direction. Alternatively, when the phase difference between the driving signals was made larger, the trail of the chip member 20 became elliptical where the diameter in the tangential direction was longer than that in the normal direction. When the phase difference between the driving signals was made 90 degrees, the trail of the chip member 20 became substantially circular. The pressure of the spring 41 was selected in a manner so that the chip member 20 was always contacted with the rotor 40.

When a region from 0N to 0.2N on the abscissa of FIG. 8 corresponding to no-load condition and light-load condition was noticed, the characteristic curve in the case of the phase difference 120 degrees was positioned above that in the case of the phase difference 60 degrees. As mentioned above, when the phase difference between the driving signals was larger, the diameter of the trail of the chip member 20 in the tangential direction at the contact point of the chip member 20 and the rotor 40 became larger and that in the normal direction became smaller. In other words, the moving velocity or the displacement of the chip member 20 in the tangential direction was larger and that in the normal direction was smaller. Alternatively, when the phase difference between the driving signals was smaller, the diameter of the trail of the chip member 20 in the tangential direction became smaller and that in the normal direction became larger. The moving velocity or the displacement of the chip member 20 in the tangential direction became smaller and that in the normal direction became larger.

With respect to the trail of the chip member 20, the velocity of the chip member 20 in the tangential direction directly influences the rotation velocity of the rotor 40 under no-load condition, and the displacement of the chip member 20 in the normal direction influences the torque of the actuator. That is, when the phase difference of the driving signals is made larger, the rotation velocity of the rotor 40 under no-load condition becomes faster, but the torque of the actuator becomes smaller. FIG. 8 reflects these consideration.

Subsequently, a method for varying the driving characteristics of the actuator by controlling the phase difference between the driving signals will be described.

In order to control the velocity of the rotor 40 serving as the driven object in the truss-type actuator, the diameter of the trail of the chip member 20 has generally been varied by controlling the amplitudes of the displacements of the piezoelectric devices 10 and 10'. Furthermore, in the actuator utilizing the resonance phenomenon, the diameter of the trail of the chip member 20 has generally been varied by controlling the frequency of the driving signals applied to the piezoelectric devices 10 and 10' in the vicinity of the natural frequencies of the piezoelectric devices 10 and 10'. These conventional methods, however, have disadvantages that the energy supplied to the actuator is varied and the burden of the electric power supply becomes larger. On the contrary, the method for varying the phase difference between the driving signals applied to the piezoelectric devices in the first embodiment has an advantage that the energy supplied to the actuator is rarely varied and the burden of the electric power supply becomes much smaller.

Figure 9:
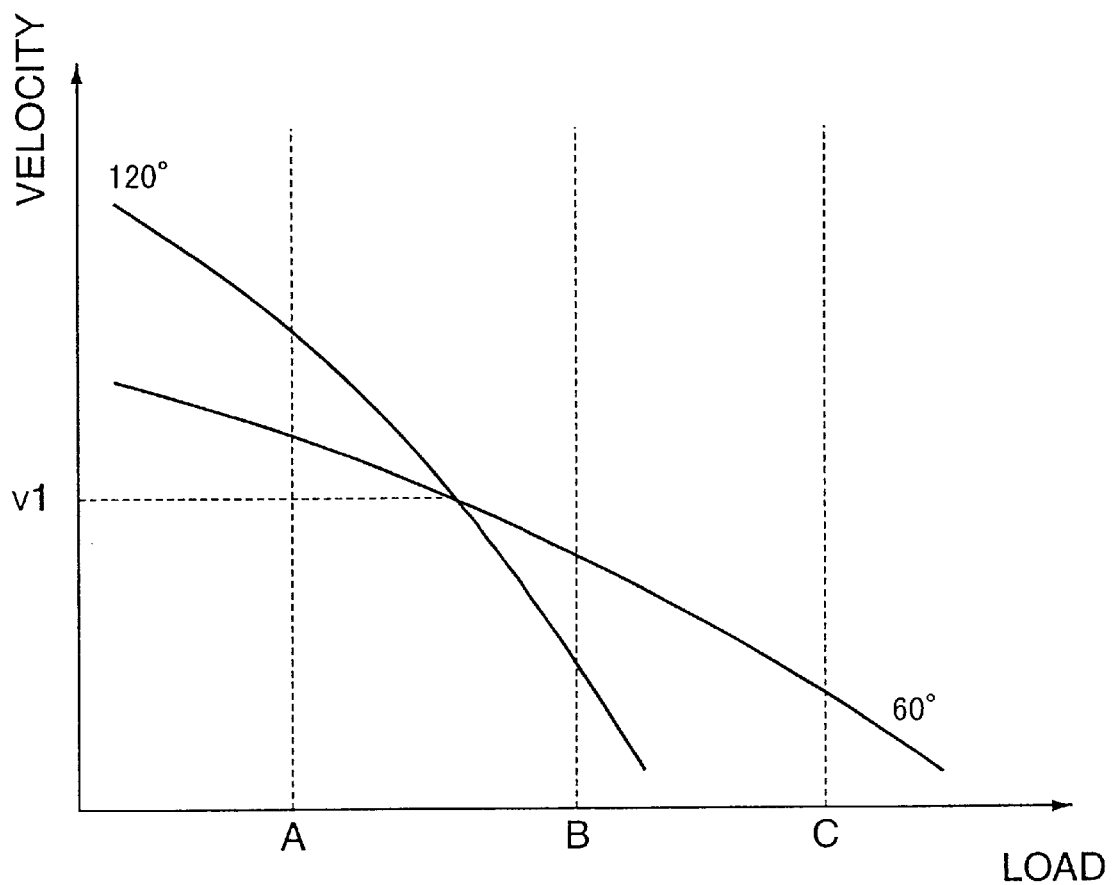
FIG. 9 is a graph for showing characteristic curves of relations between rotation velocities of the rotor and loads of the actuator in the first embodiment.

FIG. 9 shows characteristic curves between the load and the rotation velocity the rotor 40 when the phase difference between the driving signals was set to be 60 degrees and 120 degrees. In FIG. 9, the symbol "A" designates the load when the rotor 40 is continuously rotated (normal rotation load), the symbol "C" designates the load when the rotor 40 is started up to be rotated (start-up load), and the symbol "B" designates the middle load between the loads "A" and "C".

When the characteristic curve of the phase difference of 120 degrees was noticed, it was found that the velocity of the rotor 40 became 0 between the loads "B" and "C". When the phase difference of the driving signals applied to the piezoelectric devices 10 and 10' was set to be 120 degrees, the start-up force of the actuator was smaller than the static friction force of the rotor 40, so that it was impossible to rotate the rotor 40. When the characteristic curve of the phase difference of 60 degrees was noticed, it was found that the velocity of the rotor 40 became zero, when the load is larger than the load "C". When the phase difference of the driving signals was set to be 60 degrees, the start-up force of the actuator was larger than the static friction force of the rotor 40, so that it was possible to rotate the rotor 40. Thus, the actuator in accordance with the first embodiment is controlled to be driven by the driving signals having the phase difference of 60 degrees at the start-up time, and to be driven by the driving signals having the phase difference of 120 degrees after when the load becomes smaller. By such the control system, it is possible to provide the actuator having a large start-up force and a high rotation velocity of the rotor 40.

Subsequently, it was considered that the load was varied from "A" to "B" while the actuator was driven. When the load "B" was noticed, it was found that the velocity of the rotor 40 driven by the driving signals having the phase difference of 60 degrees was faster than that driven by the driving signals having the phase difference of 120 degrees. Thus, it is possible to rotate the rotor 40 faster by switching the driving signals of the piezoelectric devices 10 and 10' from having the phase difference of 120 degrees to having the phase difference of 60 degrees. In this example, when the velocity of the rotor 40 is faster than the velocity v1 where two characteristic curves cross, the phase difference of the driving signals applied to the piezoelectric devices 10 and 10' is set to be 60 degrees, and when the velocity of the rotor 40 is slower than the velocity v1, the phase difference of the driving signals applied to the piezoelectric devices 10 and 10' is set to be 120 degrees. Thus, the rotor 40 is rotated as fast as possible.

In the above-mentioned first embodiment, the phase difference between the driving signals applied to the piezoelectric devices 10 and 10' is controlled for varying the diameter of the trail of the chip member 20 in a manner to make the rotation velocity of the rotor 40 faster and to make the start-up force of the actuator larger. As a result, the electric power consumption of the actuator becomes substantially constant with no relation to the rotation velocity of the rotor 40 or the load of the actuator, so that it is possible to make the burden of the electric power supply much smaller, substantially to zero. Furthermore, the phase difference between the driving signals applied to the piezoelectric devices 10 and 10' is switched corresponding to the rotation velocity of the rotor 40 or the load of the actuator after the starting-up of the driving of the actuator, the rotor 40 can be rotated at the fastest velocity or be driven by the largest torque as possible.

SECOND EMBODIMENT

Figure 10:
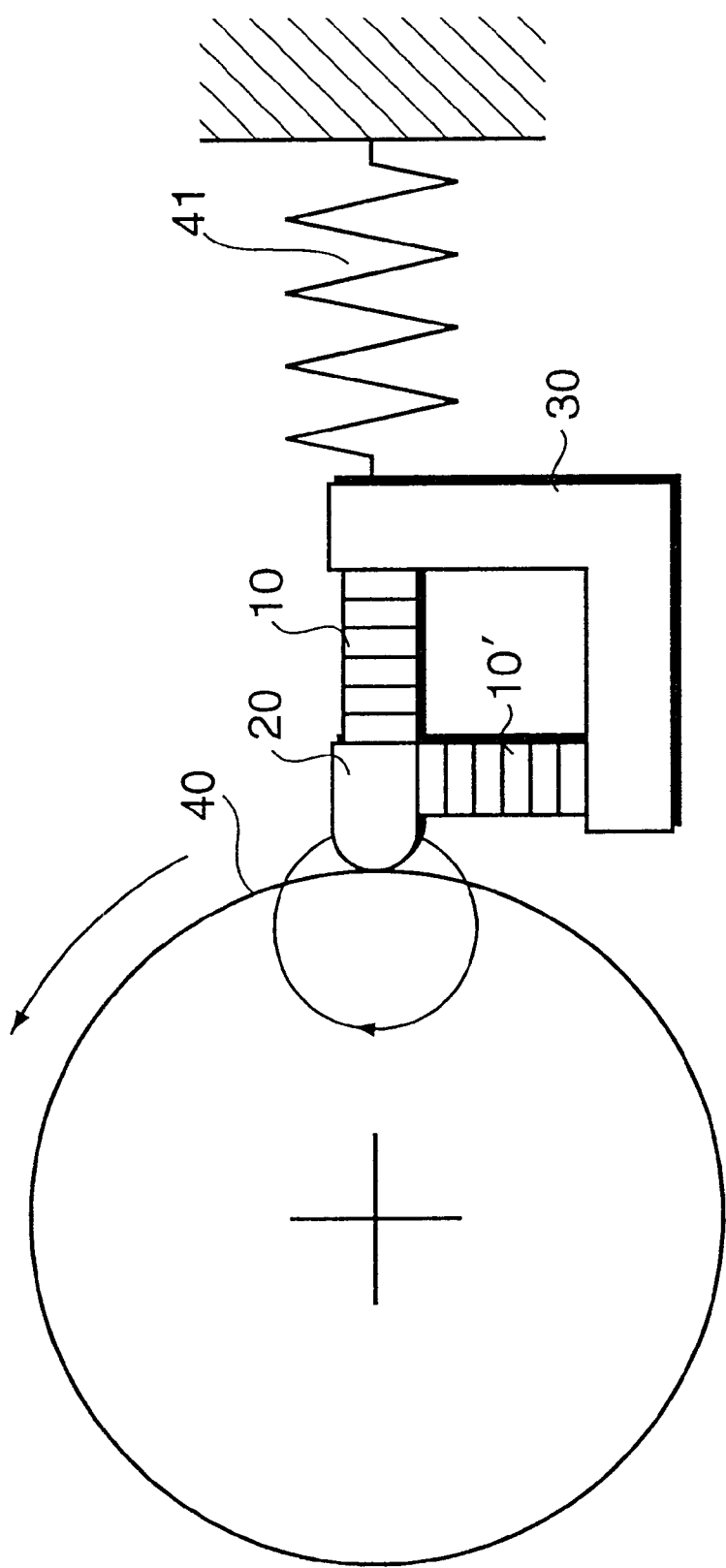
FIG. 10 is front view for showing a configuration of an actuator in a second embodiment of the present invention.

A second embodiment of an actuator in accordance with the present invention is described. FIG. 10 shows a configuration of a truss-type actuator in the second embodiment. As can be seen from FIG. 10, the first piezoelectric device 10 is arranged in parallel with the normal direction at the contacting point of the chip member 20 with the rotor 40, and the second piezoelectric device 10' is arranged in parallel with the tangential direction. The other elements except the shape of the chip member 20 and the position of the spring 41 are substantially the same as those in the above-mentioned first embodiment.

Figure 11:
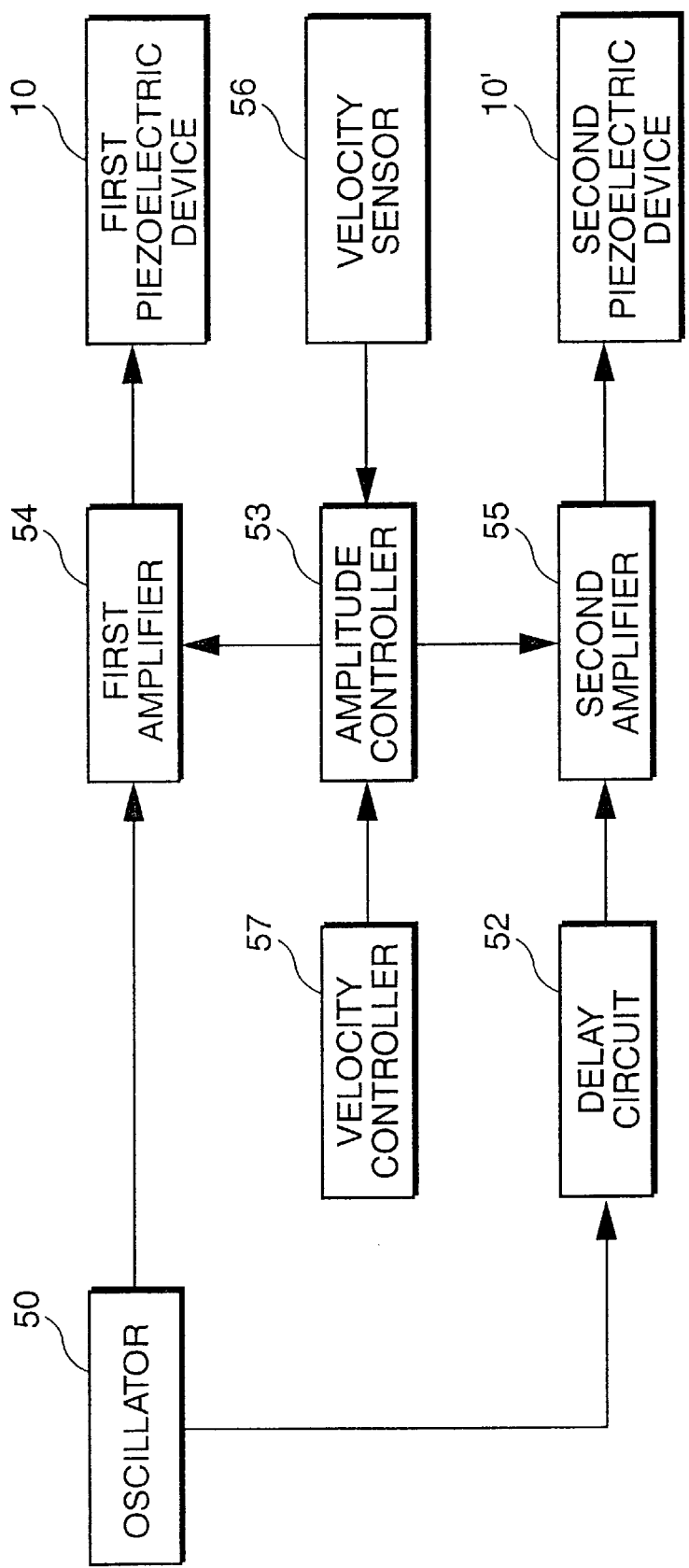
FIG. 11 is a block diagram for showing a configuration of a driving circuit of the actuator in the second embodiment.

A block diagram of a driving circuit is shown in FIG. 11. An oscillator 50 generates a sinusoidal signal having a predetermined frequency coinciding with resonance frequencies of the first piezoelectric device 10 and the second piezoelectric device 10'. A velocity sensor 56 such as a pulse encoder or a magneto-resistive device senses a rotation velocity of the rotor 40 and outputs the sensed result to an amplitude controller 53. The amplitude controller 53 compares the actual rotation velocity of the rotor 40 inputted from the velocity sensor 56 with a desires rotation velocity inputted from a velocity controller 57 such as a computer for controlling the actuator, calculates the most suitable amplitude of two driving signals respectively applied to the first and second piezoelectric devices 10 and 10', and controls amplification factors of a first amplifier 54 and a second amplifier 55 corresponding to the calculation results. The first amplifier 54 amplifies the sinusoidal driving signal from the oscillator 50 corresponding to the control signal from the amplitude controller 53. The second amplifier 55 amplifies the sinusoidal driving signal from the delay circuit 52 corresponding to the control signal from the amplitude controller 53. The amplified sinusoidal driving signals amplified by the first amplifier 54 and the second amplifier 55 are respectively applied to the first piezoelectric device 10 and the second piezoelectric device 10'. In the second embodiment, the phase difference between the driving signals applied to the piezoelectric devices 10 and 10' is fixed.

In the second embodiment shown in FIG. 10, the shape of the trail of the chip member 20 is varied by the variations of the amplitudes of the displacements of the piezoelectric devices 10 and 10'. For varying the diameter of the trail of the chip member 20 in the tangential direction, the voltage of the driving signal applied to the second piezoelectric device 10' is controlled. For varying the diameter of the trail of the chip member 20 in the normal direction, the voltage of the driving signal applied to the first piezoelectric device 10 is controlled. Furthermore, it is preferable to reverse the direction of the voltage of one driving signal applied to one piezoelectric device when the voltage of the other driving signal applied to the other piezoelectric device is controlled so as to make the electric power consumption of the actuator be constant. In the latter case, the electric power consumption becomes constant, so that the burden of the electric power supply be much smaller, substantially to zero.

THIRD EMBODIMENT

In the above-mentioned first and second embodiment, the piezoelectric device is used as the displacing device. The ceramics which is a material of the ceramic thin plate has larger damping ratio of the vibrations and the smaller magnification factor of the resonant vibration than those of the metal materials. Furthermore, the ceramics is stronger with respect to the pressure but weaker with respect to the tension, so that it will be separated from the adhered faces in the lamination type piezoelectric device. In a third embodiment, a series connection of a single layered piezoelectric device and an elastic member made of a metal is used as a displacing device.

Figure 12:
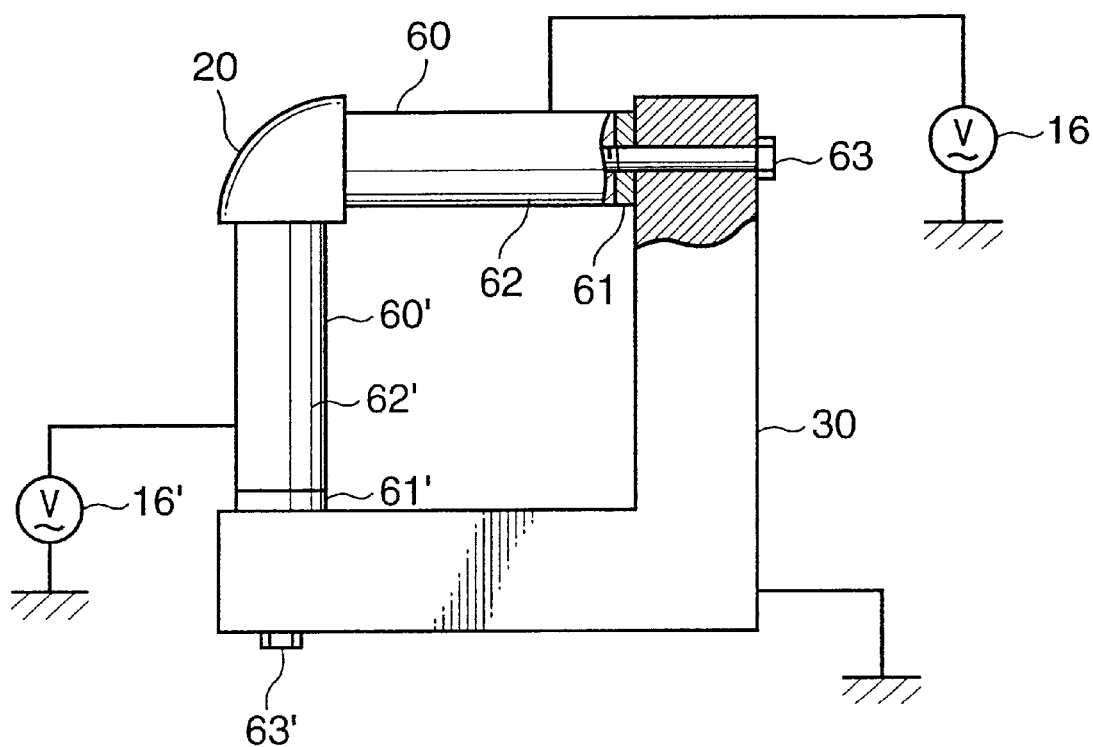
FIG. 12 is a front view for showing a configuration of an actuator in a third embodiment.

A configuration of the actuator in accordance with the third embodiment is shown in FIG. 12. A first displacing device 60 and a second displacing device 60' are respectively configured by single layered piezoelectric devices (ceramic thin plates) 61 and 61', and elastic members 62 and 62'. No electrode is provided on both surface of the piezoelectric devices 61 and 61'. Base ends of the first displacing device 60 and the second displacing device 60' are respectively fixed on the base member by screws 63 and 63' without using any adhesive. On the other hand, the chip member 20 is connected on top ends of the first displacing device 60 and the second displacing device 60' by an adhesive or screws. The elastic members 62 and 62' and the base member 30 are respectively formed by conductive materials. Two driving power sources 16 and 16' are connected between the elastic members 62 and the base member 30 and the elastic member 62' and the base member 30 so as to drive the first displacing device 60 and the second displacing device 60' at the above-mentioned resonance frequencies.

When the elastic member 62 or 62' is vibrated at the resonance frequency by the piezoelectric device 61 or 61' using as an oscillator, the displacement of the first displacing device 60 or the second displacing device 60' can be enlarged. Furthermore, the tension acting on the piezoelectric devices 61 and 61' becomes smaller, so that the destruction of the piezoelectric devices 61 and 61' can be prevented. As a material of the elastic members 62 and 62', aluminum, titanium, iron, copper, and an alloy including at least one of them can be used. Since the ratio of the piezoelectric devices 61 and 61' in the length of the displacing devices 60 and 60' is very small, the affect due to the piezoelectric devices 61 and 61' can be ignored when the above-mentioned normal vibration is calculated.

Furthermore, in the above-mentioned first to third embodiments, the frequencies of the driving signals applied to the piezoelectric devices 10 and 10' or 61 and 61' are not described concretely. It, however, is possible to drive the piezoelectric devices 10 and 10' by the driving signals having a frequency equal to the natural frequency of the piezoelectric devices 10 and 10' for utilizing the resonance phenomenon, or to drive the piezoelectric devices 61 and 61' by the driving signals having a frequency so as to vibrate the elastic members 62 and 62' at the resonance frequency. In these cases, impedance of the piezoelectric devices 10 and 107 is reduced, so that the electric power consumption of the actuator can be reduced. In other words, a high power can be obtained by a small electric power consumption.

Furthermore, in the above-mentioned description of the first to third embodiment, the trail of the movement of the chip member 20 is explained as elliptical shape. It, however, is needless to say that the circular trail of the chip member 20 can be included in the scope of the present invention by controlling the phase difference or the voltages of the driving signals applied to the piezoelectric devices 10 and 10' or 61 and 61'.

FOURTH EMBODIMENT

A fourth embodiment of a driving method for an actuator in accordance with the present invention is described. In the fourth embodiment, the amplitudes and the phase difference of the driving signals applied to the piezoelectric devices 10 and 10' are varied so as to control the direction of the major axis or the minor axis of the elliptical trail of the chip member 20. The actuator driven by the method in the fourth embodiment is substantially the same as that shown in FIG. 3.

FIGS. 13A to 13C respectively show the trails of the chip member 20 when the phase difference of the driving signals applied to the piezoelectric devices 10 and 10' is varied. FIG. 13A shows the trail when the phase difference between the driving signals applied to the piezoelectric actuators 10 and 10' is 60 degrees. FIG. 13B shows the trail when the phase difference between the driving signals is 90 degrees. FIG. 13C shows the trail when the phase difference between the driving signals is 120 degrees.

As can be seen from FIGS. 13A to 13C, when the phase difference between the driving signals is set to be 90 degrees, the trail of the chip member 20 becomes circular. When the phase difference between the driving signals is smaller than 90 degrees, the trail of the chip member 20 becomes elliptical where the major axis of the ellipse is oriented in the normal direction at the contacting point of the chip member 20 with the rotor 40 (not shown). Alternatively, when the phase difference between the driving signals is larger than 90 degrees, the trail of the chip member 20 becomes elliptical where the major axis of the ellipse is oriented in the tangential direction at the contacting point of the chip member 20 with the rotor 40.

FIGS. 14A to 14D respectively show the trails of the chip member 20 when not only the phase difference but also the amplitudes of the driving signals applied to the piezoelectric devices 10 and 10' are varied. FIG. 14A shows the trail when the phase difference between the driving signals is 60 degrees and the amplitude of the driving signal applied to the first piezoelectric device 10 is smaller than that applied to the second piezoelectric device 10'. FIG. 14B shows the trail when the phase difference is 60 degrees and the amplitude of the driving signal applied to the first piezoelectric device 10 is larger than that applied to the second piezoelectric device 10'. FIG. 14C shows the trail when the phase difference is 120 degrees and the amplitude of the driving signal applied to the first piezoelectric device 10 is smaller than that applied to the second piezoelectric device 10'. FIG. 14D shows the trail when the phase difference is 120 degrees and the amplitude of the driving signal applied to the first piezoelectric device 10 is larger than that applied to the second piezoelectric device 10'.

As can be seen from FIGS. 14A to 14D, in case that the phase difference between the driving signals is 60 degrees, when the amplitude of the driving signal applied to the first piezoelectric device 10 is made smaller than that applied to the second piezoelectric device 10', the major axis of the elliptical trail of the chip member 20 inclines toward the first piezoelectric device 10 from the normal direction. Alternatively, when the amplitude of the driving signal applied to the second piezoelectric device 10' is made smaller than that applied to the first piezoelectric device 10, the major axis of the elliptical trail of the chip member 20 inclines toward the second piezoelectric device 10' from the normal direction.

On the other hand, in case that the phase difference of the driving signals is 120 degrees, when the amplitude of the driving signal applied to the first piezoelectric device 10 is made smaller than that applied to the second piezoelectric device 10', the minor axis of the elliptical trail of the chip member 20 inclines toward the second piezoelectric device 10' from the normal direction. Alternatively, when the amplitude of the driving signal applied to the second piezoelectric device 10' is made smaller than that applied to the first piezoelectric device 10, the minor axis of the elliptical trail of the chip member 20 inclines toward the first piezoelectric device 10 from the normal direction.

Figure 15:
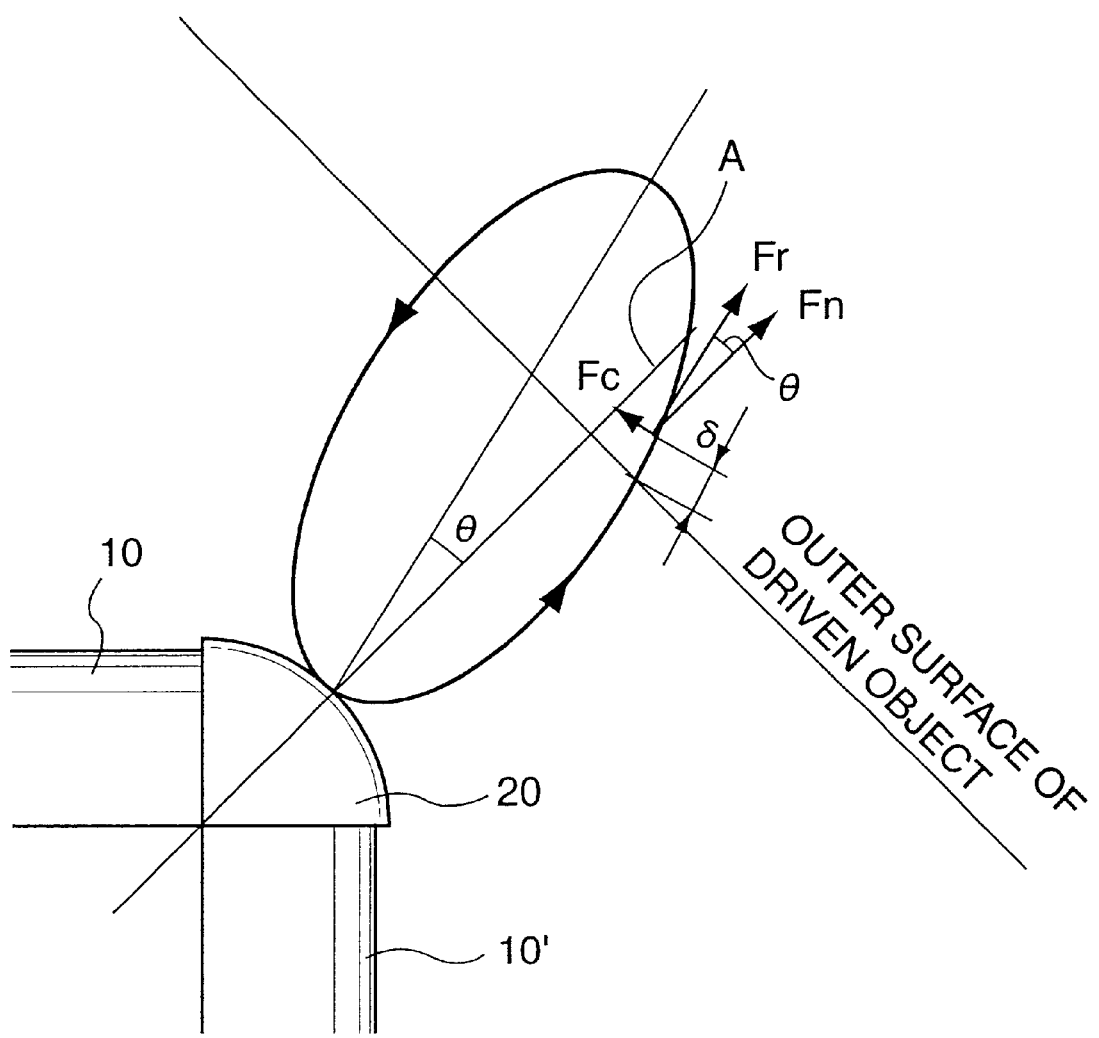
FIG. 15 is a partial front view for showing the details of inclination of a major axis of an elliptical trail of the chip member in the fourth embodiment.

FIG. 15 shows the details of the inclination of the major axis of the elliptical trail of the chip member 20 in case that the phase difference between the driving signals is 60 degrees and the amplitude of the driving signal applied to the first piezoelectric device 10 is smaller than that applied to the second piezoelectric device 10', which corresponds to FIG. 14A.

In FIG. 15, a symbol "θ" designates an inclination angle between the normal direction designated by a symbol "A" and the major axis of the ellipse. When the actuator is driven, the chip member 20 is contacted with the rotor 40 (not shown in FIG. 15) by the pressure of the spring 41 (not shown), so that the rotor 40 serving as the driven object is elastically deformed. The deformation quantity of the rotor 40 is designated by a symbol "δ". At this time, a force "Fr" which is applied to the rotor (driven object) 40 by the chip member 20 is shown by the following equation (1).

$$Fr = kr \times \delta \tag{1}$$

Hereupon, the symbol "kr" is a spring constant obtained from an elastic modulus of a material of the driven object (rotor 40). A driving force "Ft" following to an outer surface of the driven object for moving the driven object is shown by the following equation (2).

$$Ft = Fr \times \sin \delta \tag{2}$$

Since the driving force "Ft" is a function of the inclination angle "θ", it is possible to control the driving force of the actuator by varying the inclination angle "θ" which is varied by controlling the phase difference and the amplitude of the driving signals applied to the piezoelectric devices 10 and 10'.

Figure 16:
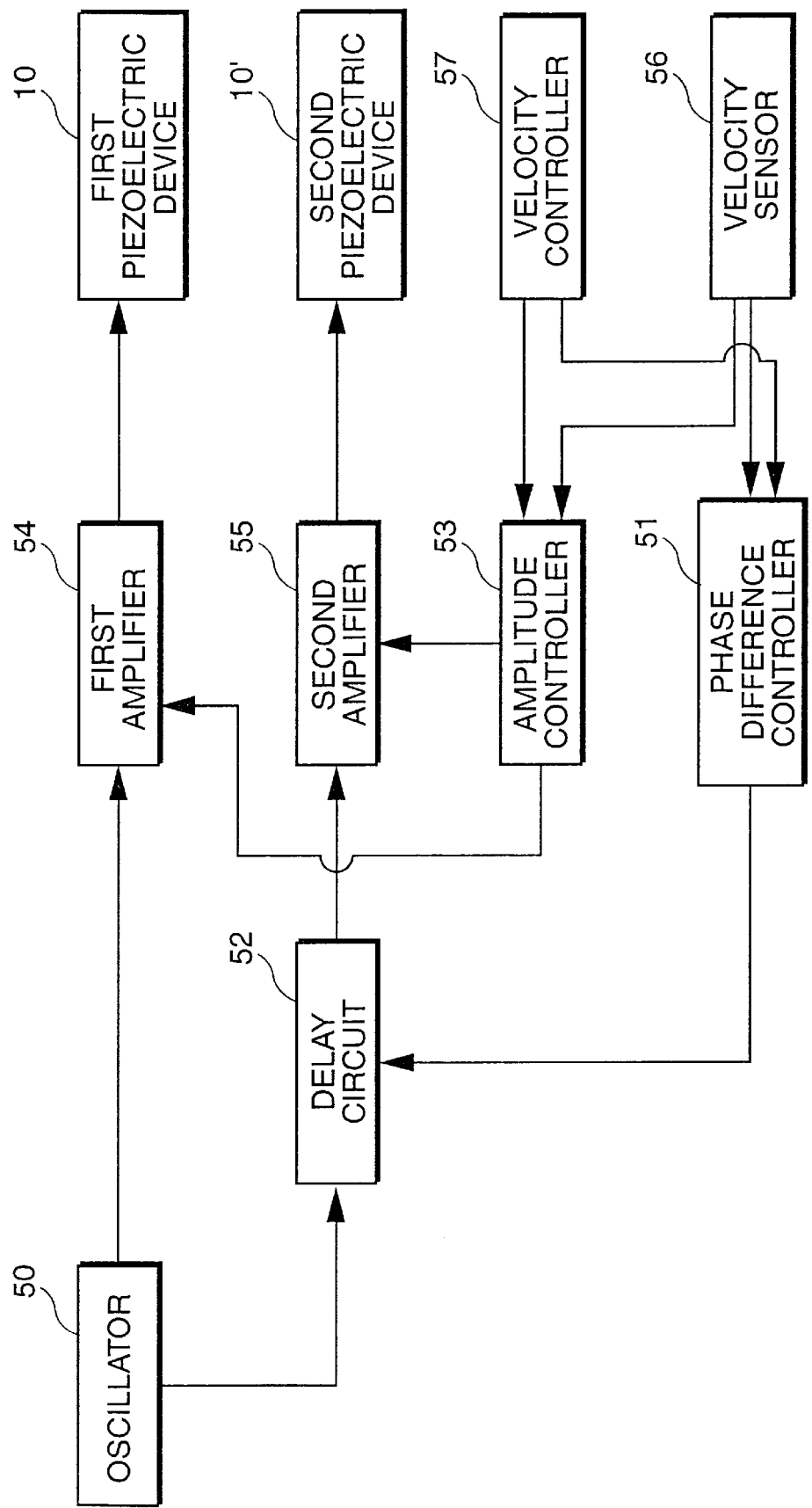
FIG. 16 is a block diagram for showing a configuration of a driving circuit of the actuator in the fourth embodiment.

FIG. 16 shows a block diagram of a driving circuit in the fourth embodiment. An oscillator 50 generates a sinusoidal signal having a predetermined frequency coinciding with resonance frequencies of the first piezoelectric device 10 and the second piezoelectric device 10'. A velocity sensor 56 such as a pulse encoder or a magneto-resistive device senses a rotation velocity of the rotor 40 and outputs the sensed result to a phase difference controller 51 and an amplitude controller 53. The phase difference controller 51 compares the actual rotation velocity of the rotor 40 inputted from the velocity sensor 56 with a desires rotation velocity inputted from a velocity controller 57 such as a computer for controlling the actuator, calculates the most suitable phase difference between two driving signals respectively applied to the first and second piezoelectric devices 10 and 10', and controls a delay circuit 52 corresponding to the calculated result. The delay circuit 52 generates a sinusoidal signal having a predetermined phase difference with the sinusoidal driving signal from the oscillator 50.

The amplitude controller 53 compares the actual rotation velocity of the rotor 40 inputted from the velocity sensor 56 with a desires rotation velocity inputted from the velocity controller 57, calculates the most suitable amplitude of two driving signals respectively applied to the first and second piezoelectric devices 10 and 10', and controls amplification factors of a first amplifier 54 and a second amplifier 55 corresponding to the calculation results. The first amplifier 54 amplifies the sinusoidal driving signal from the oscillator 50 corresponding to the control signal from the amplitude controller 53. The second amplifier 55 amplifies the sinusoidal driving signal from the delay circuit 52 corresponding to the control signal from the amplitude controller 53. The amplified sinusoidal signals amplified by the first amplifier 54 and the second amplifier 55 are respectively applied to the first piezoelectric device 10 and the second piezoelectric device 10'.

Figure 17A:
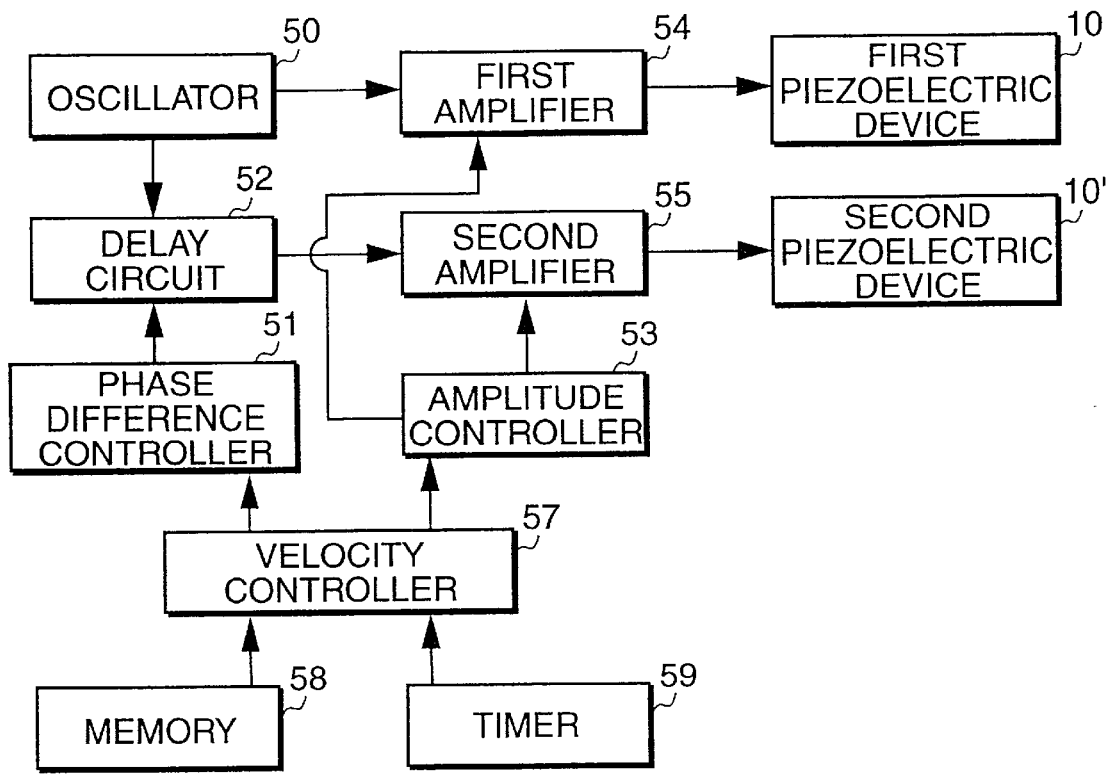
FIG. 17A is a block diagram for showing a configuration of a modified driving circuit of the actuator in the fourth embodiment.
Figure 17B:
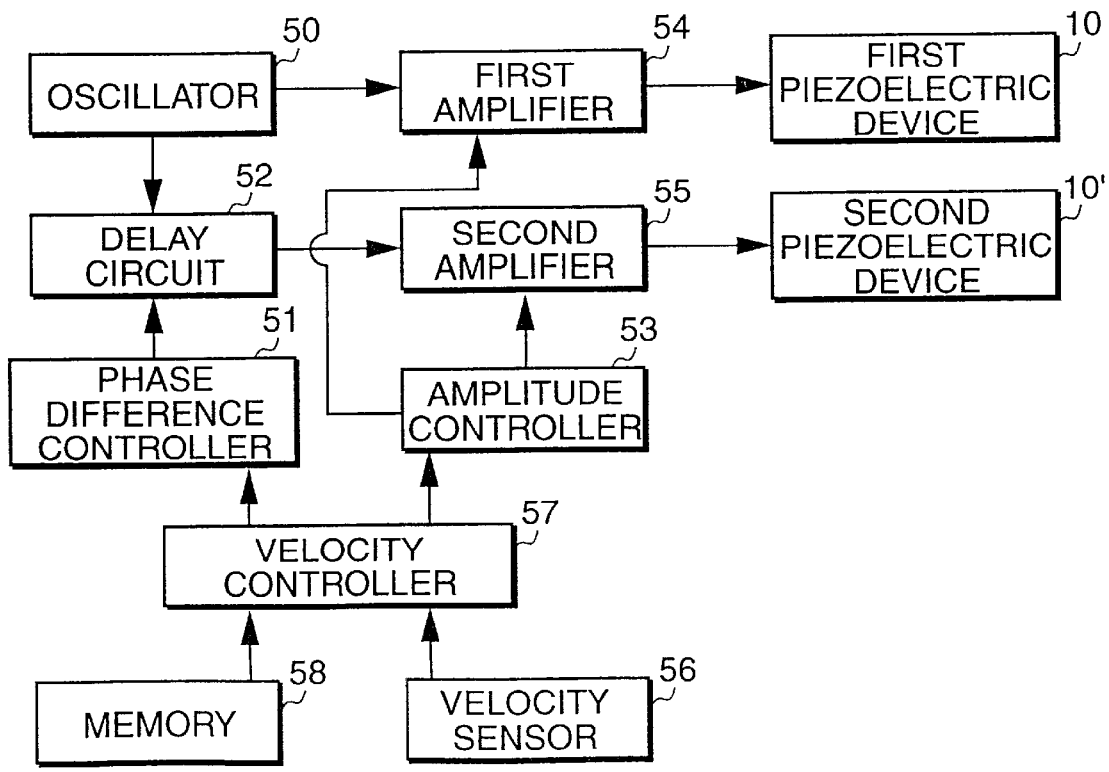
FIG. 17B is a block diagram for showing a configuration of another modified driving circuit of the actuator in the fourth embodiment.

Alternatively, it is possible to use another driving circuit shown in FIG. 17A or 17B. In the driving circuit shown in FIG. 17A, it uses a memory 58 and a timer 59 connected to the velocity controller 57 instead of the velocity sensor 56. The memory 58 stores several kinds of driving patterns from a low velocity and high torque driving to a high velocity and low torque driving respectively including the phase difference information and the amplitude information of the driving signals. The timer 59 counts a time from the start-up of the actuator. When the timer 59 counts a predetermined time period, the velocity controller 57 reads out a driving pattern corresponding to the time period from the start-up from the memory 58, and controls the phase difference controller 51 or the amplitude controller 53 corresponding to the phase difference information or the amplitude information included in the driving pattern.

In the driving circuit shown in FIG. 17B, output signal from the velocity sensor 56 is input to the velocity controller 57, and a memory 58 is connected to the velocity controller 57. The memory 58 stores several kinds of driving patterns from a low velocity and high torque driving to a high velocity and low torque driving respectively including the phase difference information and the amplitude information of the driving signals. The velocity sensor 56 senses the rotation velocity of the rotor 40. When the rotation velocity of the rotor 40 reaches to a predetermined velocity, the velocity controller 57 reads out a driving pattern corresponding to the rotation velocity of the rotor 40 from the velocity sensor 56, and controls the phase difference controller 51 or the amplitude controller 53 corresponding to the phase difference information or the amplitude information included in the driving pattern.

In the above-mentioned description of the fourth embodiment, the phase difference and the amplitudes of the driving signals are varied for controlling the inclination angle of the elliptical trail of the chip member 20. It, however, is possible to vary the amplitudes of the driving signals for controlling the inclination angle of the elliptical trail of the chip member 20. When not only the rotation speed of the rotor 40 but also the start-up torque of the actuator are controlled, it is possible to vary the phase difference of the driving signals, too.

With respect to the driving mode of the piezoelectric devices 10 and 10', it is possible to drive the piezoelectric devices 10 and 10' in alternative of the resonance vibration mode in which the frequency of the driving signals is substantially the same as the natural frequency of the piezoelectric devices 10 and 10' and the non-resonance vibration mode in which the frequency of the driving signals is different from the natural frequency of the piezoelectric devices 10 and 10'. The resonance vibration mode has an advantage that the driving efficiency of the actuator is higher, so that the voltage of the driving signals of the actuator can be made lower. In the resonance vibration mode, the voltage of the driving signals and the phase of the displacement of the piezoelectric devices are largely varied in the vicinity of the resonance frequency. When the resonance frequency of the first piezoelectric device 10 is different from that of the second piezoelectric device 10', it is preferable to detect the current values of the driving signals flowing in the piezoelectric devices 10 and 10', and to control the phase difference of the voltage of the driving signals so as to coincide the phase difference of the currents with a predetermined value, since the phases of the currents are in proportion to the phases of the displacements of the piezoelectric devices 10 and 10'.

Furthermore, the driving method in accordance with the fourth embodiment can be applied to the actuator in accordance with the third embodiment shown in FIG. 12.

FIFTH EMBODIMENT

A fifth embodiment of a driving method for an actuator in accordance with the present invention is described. In the above-mentioned first to fourth embodiments, the first piezoelectric device 10 and the second piezoelectric device 10' are simultaneously driven. In the fifth embodiment, only one of the piezoelectric devices 10 and 10' is driven so as to move the chip member 20 for trailing a desired trail. The driving method in the fifth embodiment cannot be realized by utilizing the resonance phenomenon. It, however, is possible to simplify the driving circuit, since only one piezoelectric device is driven. Numerical treatment and the experiment results of the driving method in the fifth embodiment will be described.

Figure 18B:
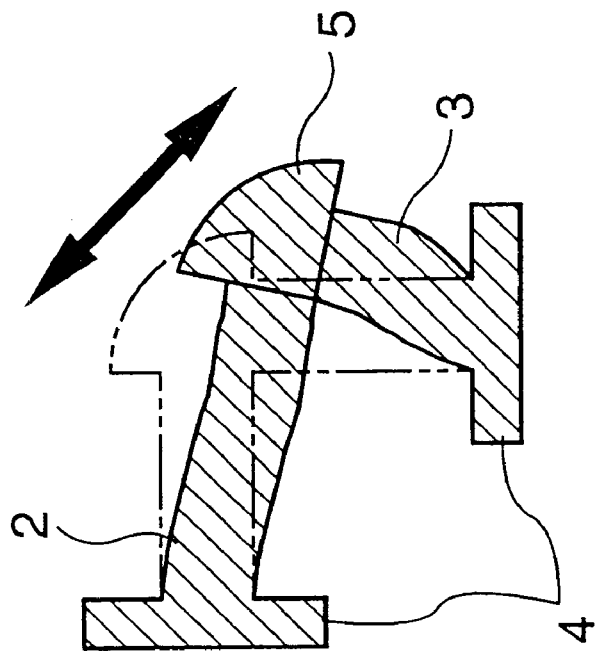
FIG. 18B is a front view for showing a vibration of two piezoelectric devices in the opposite phase mode in which one piezoelectric device is expanded or contracted when the other piezoelectric device is contracted or expanded.
Figure 18A:
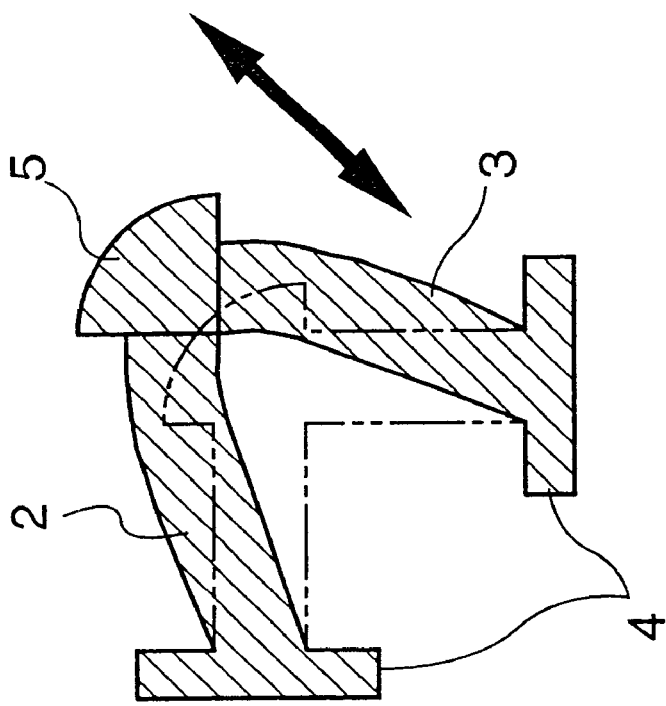
FIG. 18A is a front view for showing a vibration of two piezoelectric devices in the same phase mode in which the piezoelectric devices are expanded and contracted at the same timing.

FIG. 18A shows the vibration of the piezoelectric devices 10 and 10' in the same phase mode in which the piezoelectric devices 10 and 10' are expanded and contracted at the same timing. FIG. 18B shows the vibration of the piezoelectric devices 10 and 10' in the opposite phase mode in which the first piezoelectric device 10 is expanded or contracted when the second piezoelectric device 10' is contracted or expanded.

Figure 19:
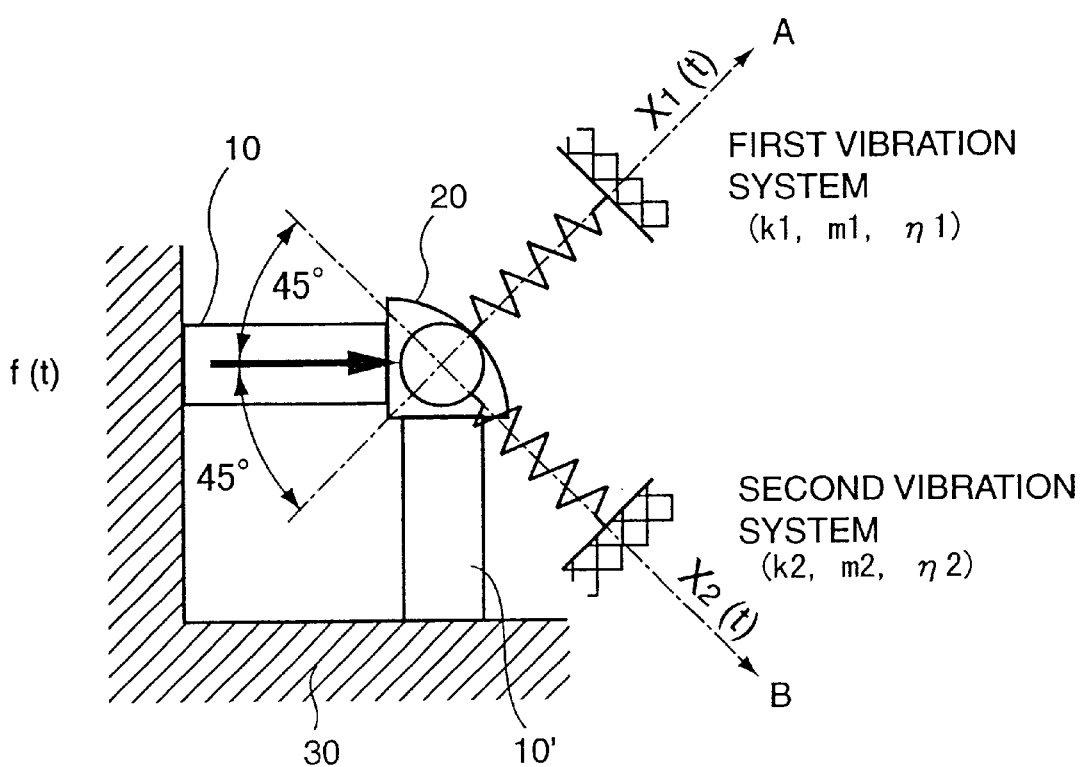
FIG. 19 is a front view for showing an equivalent single-degree-of-freedom of viscous damping vibration system of the actuator in a fifth embodiment.

FIG. 19 shows an equivalent single-degree-of-freedom of viscous damping vibration system of the actuator including springs, weights and dash pots (not shown in the figure). In FIG. 19, the same phase mode is shown as a first vibration system vibrating in the normal direction A at the contacting point of the chip member 20 with the rotor 40 (not shown in the figure), and the opposite phase mode is shown as a second vibration system vibrating in the tangential direction B. The direction of the displacement in the same phase mode crosses the direction of the displacement in the opposite phase mode at right angle, so that the vibration forces of the first piezoelectric device 10 in the axial direction thereof is symmetrically separated in the normal direction A and the tangential direction B.

When a sinusoidal vibration force $f(t)=F_0 \cdot \cos\omega t$ is applied to the single-degree-of-freedom vibration system (k: spring constant; m: mass of the weight; and η: viscosity), the displacement χ(t) of the vibration system is shown by the following equation (3).

$$\chi(t)=X \cdot \cos(\omega t - \phi) \qquad (3)$$

Hereupon, the symbol "X" designates the amplitude of the vibration of the vibration system and the symbol "φ" designates the phase delay of the actual displacement of the piezoelectric device with respect to the phase of the driving signal. The same rule applies correspondingly to the following. The amplitude X and the phase delay φ are shown by the following equations.

$$X = X_0[\{1-(\omega/\omega n)^2\}^2+(2\zeta\omega/\omega n)^2]^{1/2}$$

$$\phi = \tan^{-1}(2\zeta\omega/\omega n)/\{1-(\omega/\omega n)^2\}$$

In the above-mentioned equations, the symbol "ωn" designates the natural frequency of the vibration system and $\omega n=(k/m)^{1/2}$; the symbol "ζ" designates the damping ratio of the vibration system and $\zeta=\eta/2(mk)^{1/2}$; the symbol "$X_0$" designates the static displacement of the vibration system and $X_0=F_0/k$; and the symbol "fn" designates the resonance frequency of the vibration system and $fn=\omega n/2\pi$.

When the driving force $F_0=\cos\omega t$ generated by the piezoelectric device 10 is separated to a first component $f_1(t)$ of the first vibration system in the normal direction A and a second component $f_2(t)$ in the second vibration system in the tangential direction B, the first and second components $f_1(t)$ and $f_2(t)$ are respectively shown by the following equation (4).

$$f_1(t)=f_2(t)=(F_0/2^{1/2})\cdot\cos\omega t \tag{4}$$

When the equation (4) is substituted into the above-mentioned equation (3), the displacement $\chi_1(t)$ of the first vibration system and the displacement $\chi_2(t)$ of the second vibration system are respectively shown by the following equations (5) and (6).

$$\chi_1(t)=X_1\cdot\cos(\omega t-\phi_1) \tag{5}$$

$$\chi_2(t)=X_2\cdot\cos(\omega t-\phi_2) \tag{6}$$

Hereupon, the symbol "XI" designates the amplitude of the first vibration system, the symbol "$X_1$" designates the amplitude of the second vibration system, the symbol "$\phi_1$" designates the phase delay of the displacement in the same phase mode with respect to phase of the driving signal, and the symbol "$\phi_2$" designates the phase delay of the displacement in the opposite phase mode with respect to the phase of the driving signal. The amplitudes $X_1$, $X_2$ and the phase delays $\phi_1$, $\phi_2$ are shown by the following equations.

$$X_1=X_{01}[\{1-(\omega/\omega n_1)^2\}^2+(2\zeta_1\omega/\omega n_1)^2]^{1/2}$$

$$\phi_1=\tan^{-1}(2\zeta_1\omega/\omega n_1)/\{1-(\omega/\omega n_1)^2\}$$

$$X_2=X_{02}[\{1-(\omega/\omega n_2)^2\}^2+(2\zeta_2\omega/\omega n_2)^2]^{1/2}$$

$$\phi_2=\tan^{-1}(2\zeta_2\omega/\omega n_2)/\{1-(\omega/\omega n_2)^2\}$$

In the above-mentioned equations, the symbol "$\omega n_1$" designates the natural frequency of the first vibration system and $\omega n_{1=(k1}/m_1)^{1/2}$; the symbol "$\omega n_2$" designates the natural frequency of the second vibration system and $\omega n_2=(k_2/m_2)^{1/2}$; the symbol "$\zeta_1$" designates the damping ratio of the first vibration system and $\zeta_1=\eta_1/2(m_1k_1)^{1/2}$; the symbol "$\zeta_2$" designates the damping ratio of the second vibration system and $\zeta_2=\eta_2/2(m_2k_2)^{1/2}$; the symbol "$X_{01}$" designates the static displacement of the first vibration system and $X_{01}=F_{01}/2^{1/2}k_1$; the symbol "$X_{02}$" designates the static displacement of the second vibration system and $X_{02}=F_{02}/2^{1/2}k_2$; the symbol "$fn_1$" designates the resonance frequency of the first vibration system and $fn_1=\omega n_1/2\pi$; and the symbol "$fn_2$" designates the resonance frequency of the second vibration system and $fn_2=\omega n_2/2\pi$.

When the natural frequencies $\omega n_1$ and $\omega n_2$, damping ratios $\zeta_1$ and $\zeta_2$, and static displacements $X_{01}$ and $X_{02}$ of the first and second vibration systems are obtained, it is possible to find the relation between the frequency $f=\omega/2\pi$ of the driving signal and the displacements $\chi_1(t)$ and $\chi_2(t)$ of the first and second vibration systems.

Conditions that the trail of the chip member 20 is to be circular are considered. Since the first vibration system and the second vibration system are cross at right angle, it is known from the Lissajous' equation that the trail of the chip member 20 becomes circular when amplitudes of the vibration of the first vibration system and the second vibration system are the same but the phase difference between them becomes 90 degrees. Thus, the condition can be shown by the following equations (7) and (8). The equation (8) shows the condition that the amplitudes of the vibrations of the first vibration system and the second vibration system become the same. The equation (9) shows the condition that the phase difference between the vibrations of the first vibration system and the second vibration system becomes 90 degrees.

$$X_{01}/[\{1-(\omega/\omega n_1)^2\}^2+(2\zeta_1\omega/\omega n_1)^2]^{1/2}$$
$$=X_{02}/[\{1-(\omega/\omega n_2)^2\}^2+(2\zeta_2\omega/\omega n_2)^2]^{1/2}$$

$$\frac{(2\zeta_1\omega/\omega n)}{1-(\omega/\omega n_1)^2} \times \frac{(2\zeta_2\omega/\omega n_2)}{1-(\omega/\omega n_2)^2} = -1 \tag{8}$$

For simplifying the above-mentioned equations (7) and (8), it is assumed that $\zeta_{1=\delta 2}$ and $X_{01}=X_{02}$. The $\omega$ is deleted from the equations (7) and (8), the relation between the $\zeta$ and the $fn_1$, $fn_2$ can be shown the following equation (9). The equation (9) shows a ratio of the resonance frequencies of the first and second vibration systems.

$$fn_1/fn_2=\{\alpha\pm(\alpha^2-1)^{1/2}\} \tag{9}$$

$$(1-2\zeta^2)/(1-4\zeta^4)=\alpha$$

When the damping ratio of the vibration system is obtained, the ratio of the resonance frequencies of the first and second vibration systems by which the trail of the chip member becomes circular can be known. At this time, the frequency of the driving signal $f_3$ is shown by the following equation (10).

$$f_3=\omega_3/2\pi \tag{10}$$

$$\omega_3^2=[(2\omega n_1^2\cdot\omega n_2^2)/(\omega n_1^2+\omega n_2^2)]\cdot(1-2\zeta^2)$$

Subsequently, a relation between the ratio of the resonance frequencies and the trail of the chip member 20 in FIG. 19 is considered.

FIGS. 20A to 20G relate to a condition that the trail of the chip member 20 becomes circular when the ratio of the resonance frequencies of the vibration systems satisfies the above-mentioned equation (9). FIGS. 21A to 21G relate to an example when the resonance frequencies of the vibration systems are largely different. FIGS. 22A to 22G relates to another example that the resonance frequencies of the vibration systems are close to each other. In these cases, the first piezoelectric device 10 is driven and the damping ratio of the first and second vibration systems $\zeta_1$ and $\zeta_2$ are set to be 0.025. The values of the resonance frequencies are suitably selected.

Figure 20A:
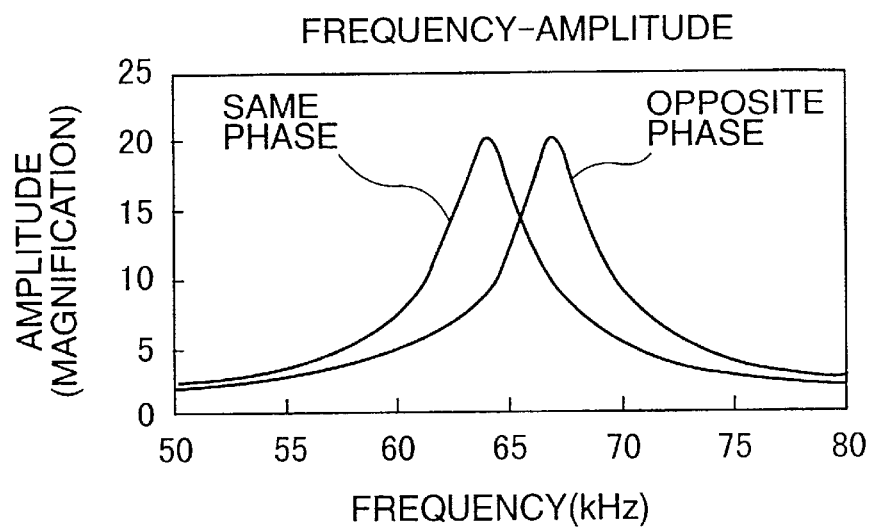
FIG. 20A is a graph for showing relations between an amplitude of a vibration and a frequency of a driving signal with respect to both of the same phase mode and the opposite phase mode when the actuator is driven under a condition that the trail of the chip member becomes circular.
Figure 20B:
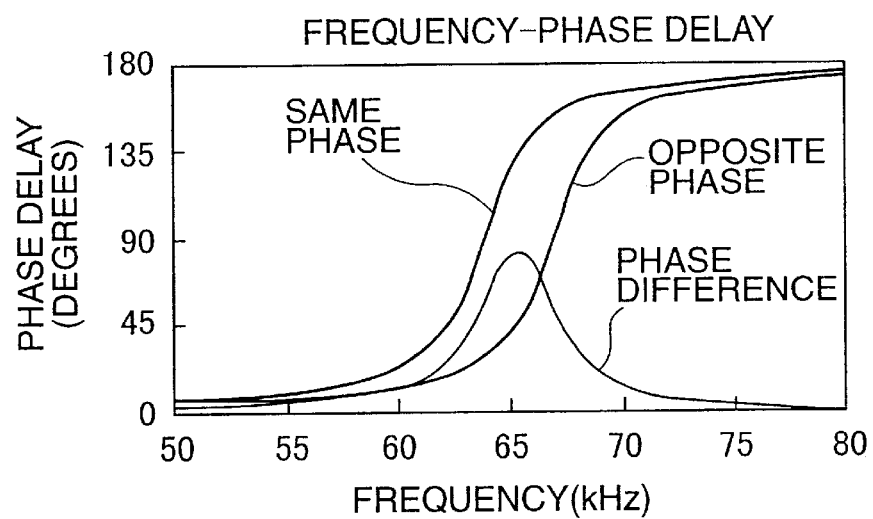
FIG. 20B is a graph for showing a relation between a phase difference of vibrations in the same phase mode and in the opposite phase mode and the frequency of the driving signal simultaneous with the above-mentioned case of FIG. 20A.
Figure 20C:
FIGS. 20C to 20G are graphs respectively for showing trails of the chip member with respect to the frequency of the driving signal.
Figure 20D:
Figure 20E:
Figure 20F:
Figure 20G:

FIG. 20A shows relations between the amplitude of the vibration and the frequency of the driving signal with respect to both of the same phase mode and the opposite phase mode. FIG. 20B shows a relation between the phase difference between the vibrations in the same phase mode and in the opposite phase mode and the frequency of the driving signal. FIG. 20C shows the trails of the chip member 20 when the frequency of the driving signal is at a low frequency. FIG. 20D shows the trails of the chip member 20 when the frequency of the driving signal is at the resonance frequency in the same phase mode. FIG. 20E shows the trails of the chip member 20 when the frequency of the driving signal is the middle between the resonance frequencies in the same phase mode and in the opposite phase mode. FIG. 20F shows the trails of the chip member 20 when the frequency of the driving signal is at the resonance frequency in the opposite phase mode. FIG. 20G shows the trails of the chip member 20 when the frequency of the driving signal is at a high frequency. The same rules applies correspondingly to the FIGS. 21A to 21g and 22! to 22G.

In FIG. 20A, when the resonance frequency $fn_1$ in the same phase mode (first vibration system) is defined to be $f_1$=64 kHz, the resonance frequency in the opposite phase mode (second vibration system) $fn_2$ becomes $f_2$=67 kHz from the equations (9) and (10), so that the frequency of the driving signal $f_3$ becomes $f_3$=65.4 kHz.

When the frequency of the driving signal $f_3$ is equal to 65.4 kHz, the amplitude of the vibrations in both of the same phase mode and the opposite phase mode coincide with each other, so that the phase difference between the vibrations in the same phase mode and in the opposite phase mode becomes 90 degrees. Thus, the trail of the chip member 20 becomes circular as shown in FIG. 20E. With respect to the first vibration system corresponding to the same phase mode, the frequency of the driving signal is larger than the resonance frequency of the first vibration system, and the amplitude of the vibration is a little smaller than the largest value at the peak on the characteristic curve with respect to the same phase mode, as shown in FIG. 20A. The phase delay of the vibration in the same phase mode with respect to the driving signal becomes larger than 90 degrees, as shown in FIG. 20B. On the other hand, with respect to the vibration in the second vibration system corresponding to the opposite phase mode, the frequency of the driving signal is smaller than the resonance frequency in the opposite phase mode, and the amplitude of the vibration is a little smaller than the largest value at the peak on the characteristic curve with respect to the opposite phase mode, as shown in FIG. 20A. The phase delay of the vibration in the opposite phase mode with respect to the phase of the driving signal becomes smaller than 90 degrees, as shown in FIG. 20B. Furthermore, the phase delay of the vibration in the same phase mode is larger than that in the opposite phase mode, so that the chip member 20 rotates in counterclockwise direction.

When the frequency of the driving signal is much smaller than the resonance frequencies of the first and second vibration systems, the amplitudes of the first and second vibration systems are substantially the same, as shown in FIG. 20A, and the phase difference between vibrations of the first and second vibration systems becomes near to zero, as shown in FIG. 20B. Thus, the trail of the chip member 20 becomes a small ellipse having a major axis along the displacing direction of the piezoelectric device 10, as shown in FIG. 20C. When the frequency of the driving signal is much larger than the resonance frequencies of the first and second vibration Systems, the same rules are applied correspondingly (see FIG. 20G). When the frequency of the driving signal coincides with one of the resonance frequencies of the first and second driving systems, both of the ratio of the amplitudes of the vibrations of the first and second vibration systems and the phase difference between the vibrations of the first and second vibration systems become larger. Thus, the trail of the chip member 20 becomes a large ellipse having a major axis along the vibration direction of the first or second vibration system, as shown in FIG. 20D or FIG. 20F.

Figure 21A:
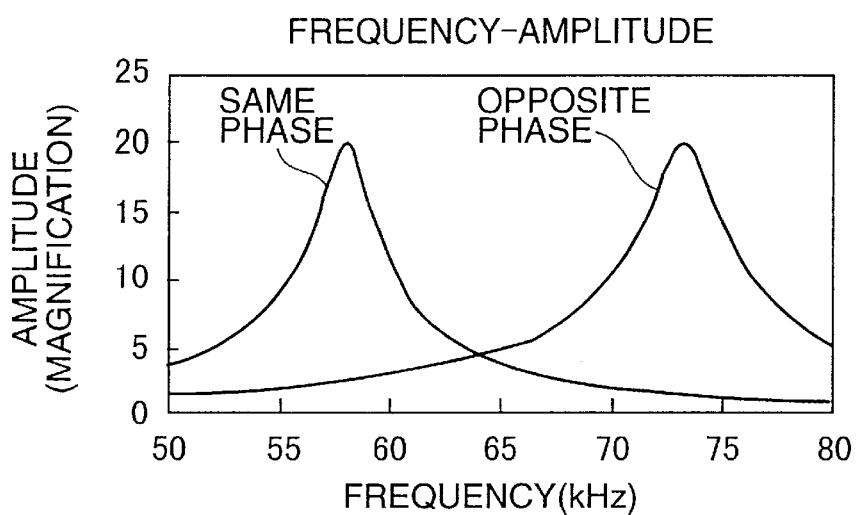
FIG. 21A is a graph for showing relations between the amplitude of the vibration and the frequency of the driving signal with respect to both of the same phase mode and the opposite phase mode when resonance frequencies of vibration systems corresponding to the same phase mode and the opposite phase mode are largely different from each other.
Figure 21B:
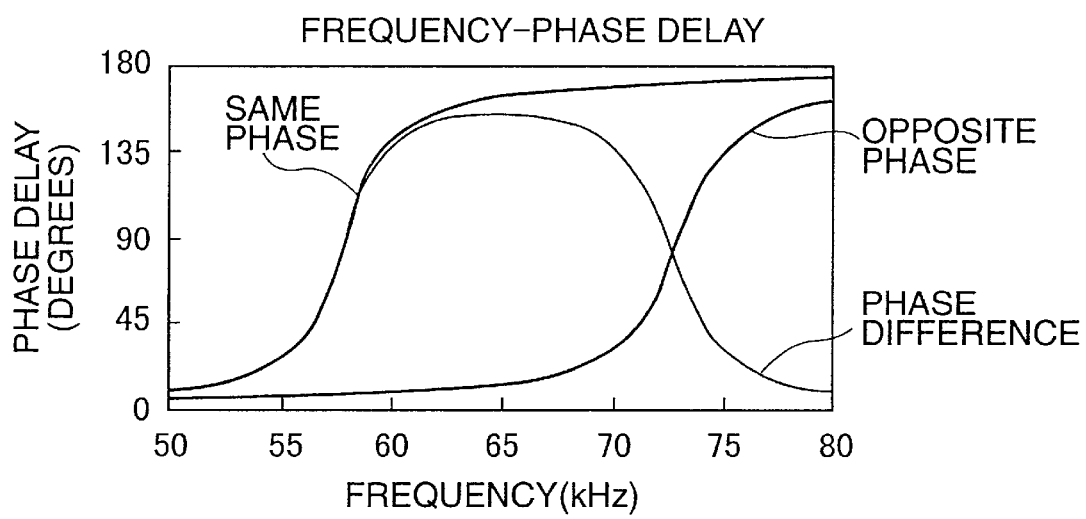
FIG. 21B is a graph for showing a relation between the phase difference of vibrations in the same phase mode and in the opposite phase mode and the frequency of the driving signal simultaneous with the above-mentioned case of FIG. 21A.
Figure 21C:
FIGS. 21C to 21G are graphs respectively for showing trails of the chip member with respect to the frequency of the driving signal.
Figure 21D:
Figure 21E:
Figure 21F:
Figure 21G:

When the resonance frequencies in the same phase mode and in the opposite phase mode are largely different, as shown in FIG. 21A, the steep sloped portions of both characteristic curves are rarely overlapped. The phase difference between the vibrations in the first and second driving systems is continuously varied between 0 to 180 degrees, as shown in FIG. 21B. When the frequency of the driving signal is much larger or much smaller than the resonance frequencies in the same phase mode and in the opposite phase mode, the trail of the chip member 20 becomes a small ellipse having a major axis along the displacing direction of the piezoelectric actuator 10, as shown in FIG. 21C or 21G. When the frequency of the driving signal coincides with one of the resonance frequencies in the same phase mode and in the opposite phase mode, the difference between the amplitudes of the vibrations of the first and second vibration systems is much larger, the trail of the chip member 20 becomes a large ellipse having a major axis along the displacing direction of the piezoelectric device 10, as shown in FIG. 21D or 21F. When the frequency of the driving signal is at the middle between the resonance frequencies, the amplitudes of the vibrations of the first and second vibration systems become equal to each other but small. The phase difference between the vibrations of the first and second vibration systems becomes close to 180 degrees. Thus, the trail of the chip member 20 becomes a small ellipse having a major axis vertical to the driving direction, as shown in FIG. 21E.

Figure 22A:
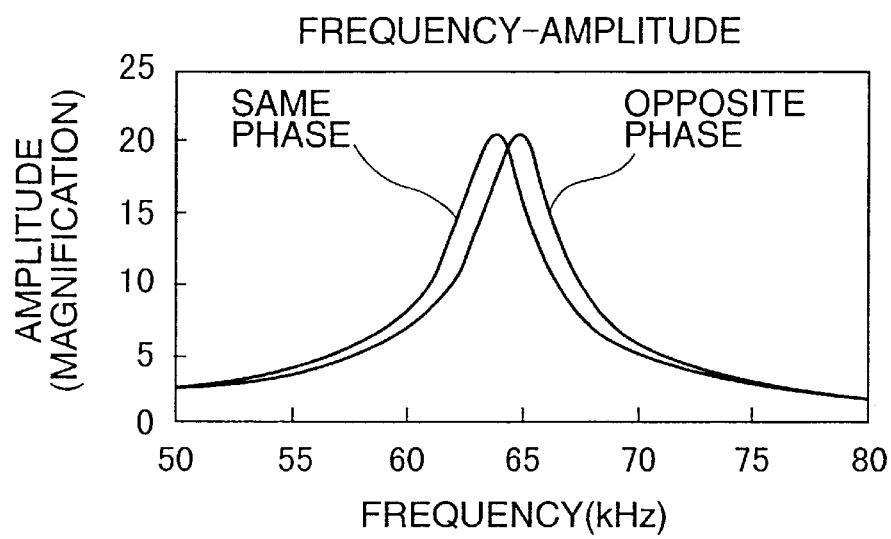
FIG. 22A is a graph for showing relations between the amplitude of the vibration and the frequency of the driving signal with respect to both of the same phase mode and the opposite phase mode when resonance frequencies of vibration systems corresponding to the same phase mode and in the opposite phase mode are close to each other.
Figure 22B:
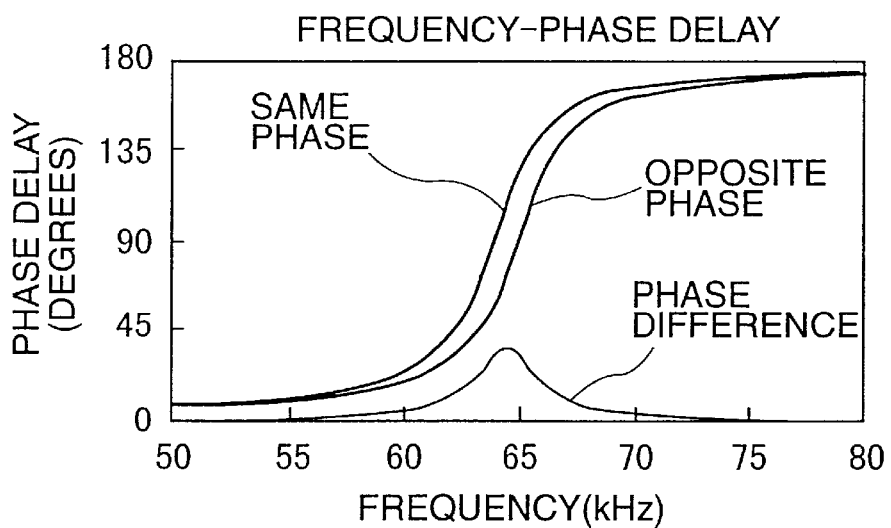
FIG. 22B is a graph for showing a relation between the phase difference of vibrations in the same phase mode and in the opposite phase mode and the frequency of the driving signal simultaneous with the above-mentioned case of FIG. 22A.
Figure 22C:
FIGS. 22C to 22G are graphs respectively for showing trails of the chip member with respect to the frequency of the driving signal.
Figure 22D:
Figure 22E:
Figure 22F:
Figure 22G:

When the resonance frequencies in the same phase mode and in the opposite phase mode are close to each other, as shown in FIG. 22A, the steep sloped portions of both characteristic curves are substantially overlapped. The peak of the characteristic curve with respect to the phase difference between the vibrations of the first and second vibration systems becomes lower, as shown in FIG. 22B. When the frequency of the driving signal is much larger or smaller than the resonance frequencies in the same phase mode and in the opposite phase mode, the trail of the chip member 20 becomes a small ellipse having a major axis along the displacing direction of the piezoelectric device 10, as shown in FIG. 22C or 22G. When the frequency of the driving signal coincides with one of the resonance frequencies in the same phase mode and in the opposite phase mode, the amplitudes of the vibrations of the first and second vibration system become substantially the same, and the phase difference between the vibrations of the first and second vibration systems becomes a little smaller, so that the trail of the chip member 20 becomes a large ellipse having a major axis along the displacing direction of the piezoelectric device 10, as shown in FIG. 22D or 22F. When the frequency of the driving signal is at the middle between the resonance frequencies, the amplitudes of the vibrations of the first and second vibration systems becomes equal to each other and large. The phase difference between the vibrations in the first and second vibration systems becomes smaller. Thus, the trail of the chip member becomes a large ellipse having a major axis vertical to the displacing direction of the piezoelectric device 10, as shown in FIG. 22E.

In the above-mentioned description, the first piezoelectric device 10 arranged in the horizontal direction in FIG. 19 is driven. Alternatively, when the second piezoelectric device 10' arranged in the vertical direction is driven, the vibration model becomes symmetrical to that in the above-mentioned case, so that the chip member 20 rotates in the clockwise direction. Furthermore, when the resonance frequency in the same phase mode is larger than that in the opposite phase mode, the phase delay in the opposite phase mode becomes larger than that in the same phase mode, so that the chip member 20 rotates in the clockwise direction.

Driving method in the fifth embodiment is described. As mentioned above, several kinds of elliptical trails of the chip member 20 can be obtained by driving only one piezoelectric device, corresponding to the values of the resonance frequencies in the same phase mode and in the opposite phase mode.

Figure 23:
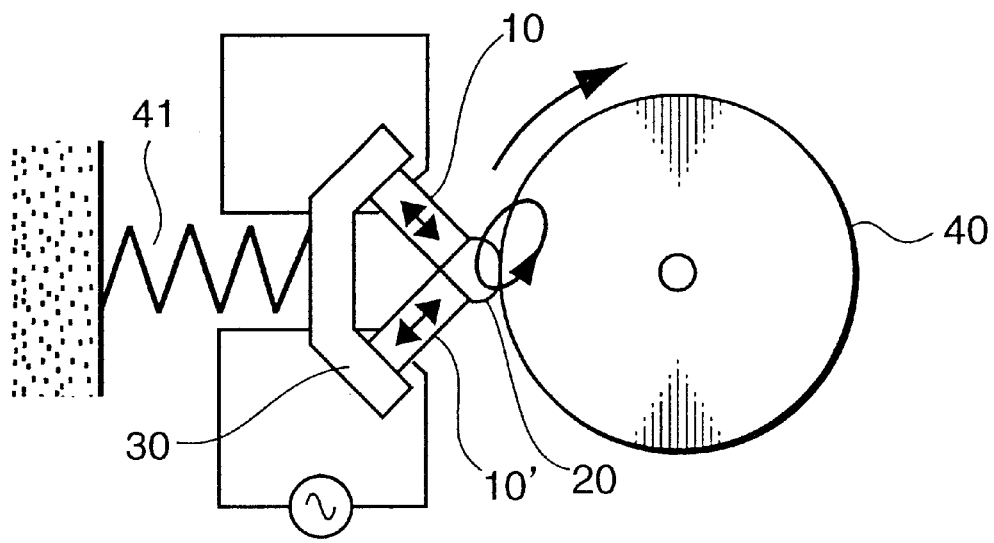
FIG. 23 is a front view for showing a driving mode of the chip member along the ellipse having the major axis inclined against the normal direction at the contacting point of the chip member with the rotor in the fifth embodiment.
Figure 24:
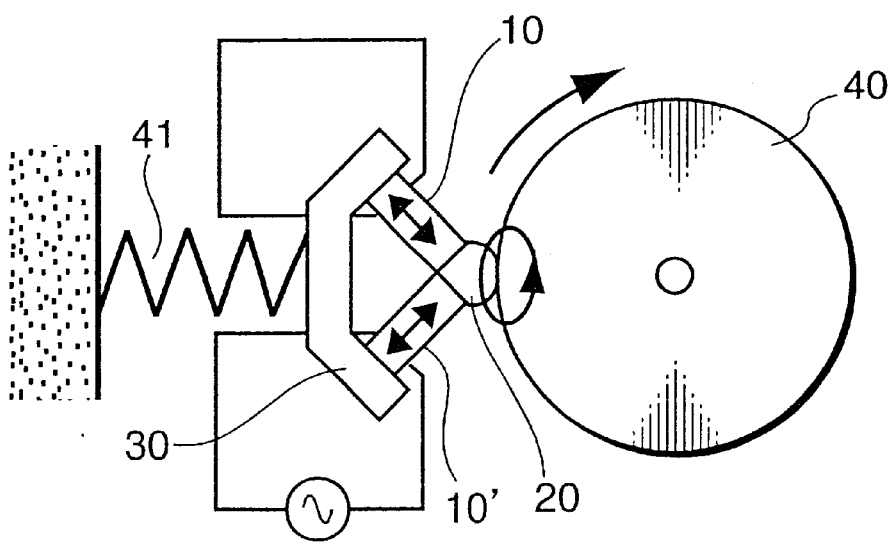
FIG. 24 is a front view for showing another driving mode of the chip member along the ellipse having the major axis parallel to the tangential direction in the fifth embodiment.

In the fifth embodiment, the resonance frequency $fn_1$ in the same phase mode is set to be larger than the resonance frequency $fn_2$ in the opposite phase mode, so that the trail of the chip member 20 shown in FIGS. 23 and 24 are obtained. In the examples shown in FIGS. 23 and 24, only the second piezoelectric device 10' is driven.

For obtaining an elliptical trail of the chip member 20, it is necessary to satisfy the following formula (11) in view of the above-mentioned equation (9) which shows the condition for obtaining the circular trail.

$$fn_1/fn_2 < \{\alpha \pm (\alpha^2-1)^{1/2}\} \quad (11)$$

For preventing the phenomenon that the moving direction of the rotor 40 serving as the driven object is reverse to the moving direction of the chip member 20 serving as a driving member when the chip member 20 is elliptically moved, it is necessary to satisfy the following formula (12).

$$1 < fn_1/fn_2 \quad (12)$$

Thus, it is necessary to satisfy the following formula (13) for moving the chip member 20 along an elliptical trail by driving only one piezoelectric device in the fifth embodiment.

$$1 < fn_1/fn_2 < \{\alpha \pm (\alpha^2-1)^{1/2}\} \quad (13)$$

When the formula (13) is satisfied, it is possible to coincide the displacing direction of the piezoelectric device 10' with the moving direction of the rotor 40 when the chip member 20 is moved along the elliptical trail. When the formula (12) is not satisfied, that is $fn_1/fn_2 < 1$, the displacing direction of the piezoelectric device 10' becomes opposite to the moving direction of the rotor 40 when the chip member 20 is moved along the elliptical trail, so that it is difficult to rotate the rotor 40.

Furthermore, it is possible to move the chip member 20 along the elliptical trail having the major axis inclined against the normal direction at the contacting point of the chip member 20 with the rotor 40 as shown in FIG. 23 or along the elliptical trail having the major axis parallel to the tangential direction as shown in FIG. 24 by suitably selecting the resonance frequencies in the same phase mode and in the opposite phase mode and the frequency of the driving signal. In FIGS. 23 and 24, the chip member 20 is moved in the clockwise direction. It, however, is possible to move the chip member 20 in the counterclockwise direction by switching the driven piezoelectric device from the second piezoelectric device 10' to the first piezoelectric device 10.

OTHER MODIFICATIONS

In the above-mentioned embodiments, the actuator has two piezoelectric devices serving as the displacing elements. The present invention is not restricted to the configuration having two displacing elements, and can be applied to the actuator having the displacing elements more than three.

Figure 27:
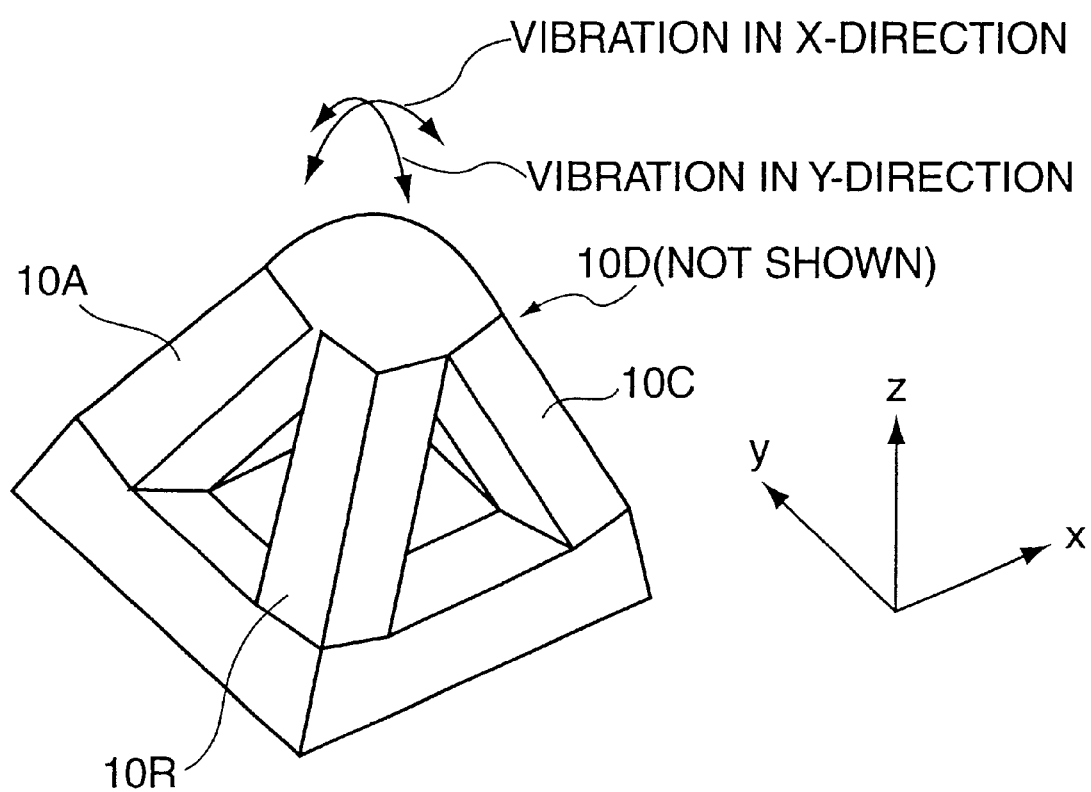
FIG. 27 is a perspective view for showing a configuration of a modified actuator in the first to fifth embodiment.

FIG. 27 shows a modification having four displacing elements 10A to 10D. For generating a vibration in a direction designated by arrow x, it is considered that the displacing elements 10A and 10B are considered to be a first group corresponding to one of the piezoelectric device 10 or 10' and the displacing elements 10C and 10D are considered to be a second group corresponding to the other. Similarly, for generating a vibration in a direction designated by arrow y, it is considered that the displacing elements 10A and 10D are considered to be a first group corresponding to one of the piezoelectric device 10 or 10' and the displacing elements 10B and 10C are considered to be a second group corresponding to the other.

Furthermore, in the above-mentioned embodiments, the rotor 40 is used as the driven object. The present invention, however, is not restricted to the above-mentioned embodiment. It is possible to apply an actuator having a rotor having an elliptical section or a sliding member as the driven object. In the former case, the actuator is driven in a manner so that the major axis or the minor axis of the elliptical trail of the chip member is inclined with respect to the normal direction at the contacting point of the chip member with the elliptical rotor. When the sliding member is a plate, the actuator is driven in a manner so that the major axis or the minor axis of the elliptical trail of the chip member is inclined with respect to a line perpendicular to the contacting plane of the sliding member.

In the above-mentioned embodiments, two displacing devices are disposed for crossing at right angle. It, however, is not restricted by this disposition. It is possible to cross at another angle such as 45 degrees or 135 degrees. Furthermore, the number of the displacing devices are not restricted by two. It is possible to use more than three displacing devices for realizing a movement having three- or four-degrees-of-freedom. Still furthermore, it is possible to use another mechanical or electric displacing device such as a magnetostrictive device as a driving source.

EXPERIMENTAL RESULT

Figure 25A:
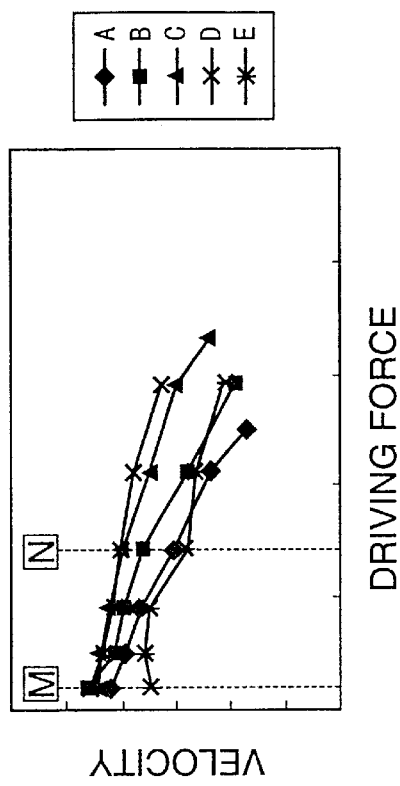
FIG. 25A is a graph for showing shapes of trails of the chip member when the actuator was driven by different driving conditions "A" to "E" under a predetermined driving force in the above-mentioned fourth embodiment.
Figure 25B:
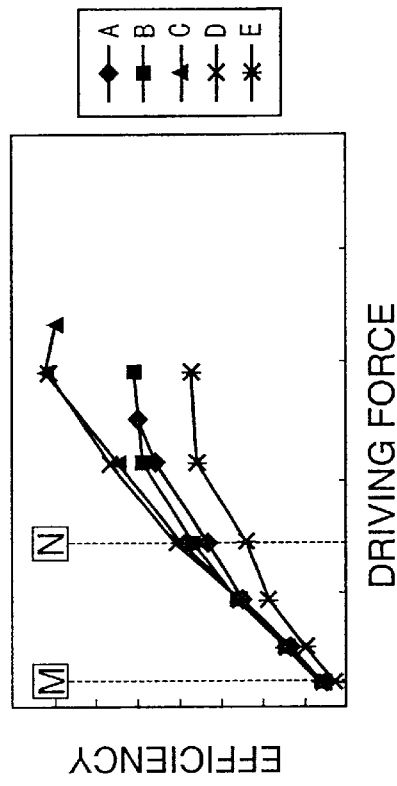
FIG. 25B is a graph for showing shapes of trails of the chip member when the actuator was driven by different driving conditions "A" to "E" under another predetermined driving force in the above-mentioned fourth embodiment.

The trails of the chip member 20 and the driving characteristics of the actuator in accordance with the fourth embodiment are described with reference to FIGS. 25A to 25D. FIGS. 25A and 25B respectively show the shapes of the trails of the chip member 20 when the actuator was driven by different driving conditions "A" to "E". The difference between FIGS. 25A and 25B was the condition of the driving force of the actuator. For example, FIG. 25A corresponds to the driving force "M" in FIG. 25C or 25D, and FIG. 25B corresponds to the driving force "N". In the figures, numerals designate the actual sizes of the elliptical trails and the unit thereof was "$\mu$m".

Figure 25C:
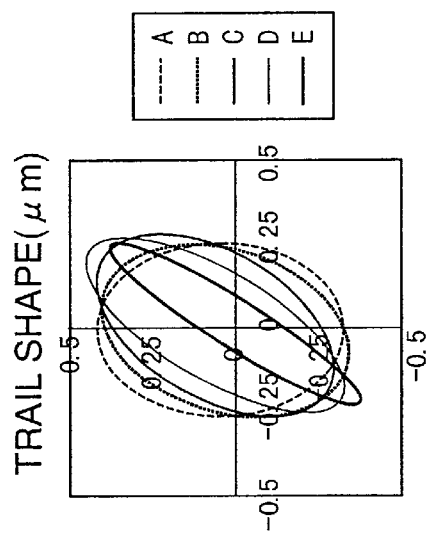
FIG. 25C is a graph for showing characteristic curves between the rotation velocity of the rotor and the driving force of the actuator with respect to the conditions "A" to "E" under the driving mode corresponding to FIG. 25A.
Figure 25D:
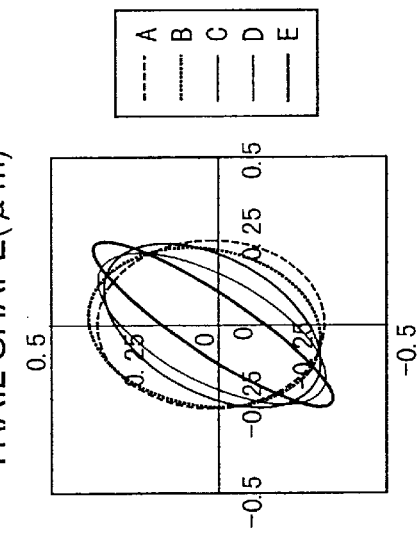
FIG. 25D is a graph for showing characteristic curves between the rotation velocity of the rotor and the driving force of the actuator with respect to the conditions "A" to "E" under the driving mode corresponding to FIG. 25B.

FIG. 25C shows the characteristic curves between the rotation velocity of the rotor 40 and the driving force of the actuator with respect to the conditions "A" to "E". In FIG. 25C, the abscissa designates the driving force of the actuator, and the ordinate designates the rotation velocity of the rotor 40. The direction of the pressure of the spring 41 was applied in parallel with the abscissa in FIGS. 25A and 25B. FIG. 25D shows the characteristic curves between the efficiency and the driving force of the actuator with respect to the conditions "A" to "E". In FIG. 25C, the abscissa designates the driving force of the actuator, and the ordinate designates the efficiency of the actuator. In FIGS. 25C and 25D, the dotted line "M" designates the condition corresponding to FIG. 25A, and the dotted line "N" designates the condition corresponding to FIG. 25B.

As can be seen from FIGS. 25A and 25B, under the driving condition "A", the major axis of the elliptical trail of the chip member 20 was parallel to the tangential direction at the contacting point of the chip member 20 with the rotor 40. Under the driving conditions "B" to "E", the inclination angle of the minor axis or the major axis of the elliptical trail of the chip member 20 with respect to the tangential direction was gradually increased.

As can be seen from FIGS. 25C and 25D, it was found that the output power and the efficiency of the actuator driven by the driving conditions "B" to "D" became larger than those driven by the driving condition "A". However, when the actuator was driven by the driving condition "'E", the minor axis of the elliptical trail became too short so that the chip member 20 moved rather linear than elliptical. Thus, the output power and the efficiency of the actuator driven by the driving condition "E" became smaller than those driven by the driving condition "A".

Accordingly, it is preferable to drive the actuator by controlling at least one of the phase difference and the amplitudes of the driving signals so that the trail of the chip member 20 becomes an ellipse having a minor axis inclined with respect to the normal direction at the contacting point of the chip member 20 with the rotor 40 in a region where the minor axis of the ellipse is not too small. The same rules are applied correspondingly to the fifth embodiment.

Figure 26A:
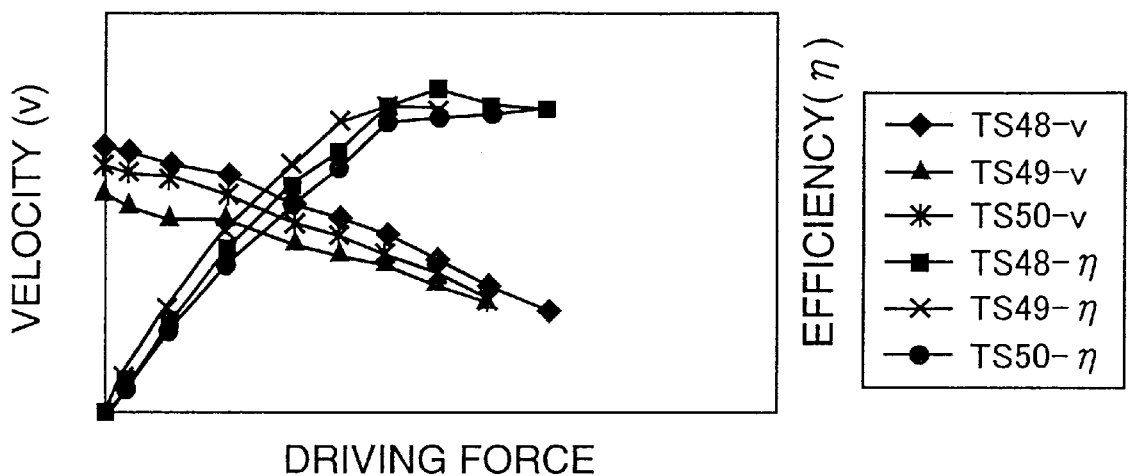
FIG. 26A is a graph for showing relations between the rotation velocity of the rotor and the driving force of the actuator in the fifth embodiment when the actuator was driven in a manner that the length of the minor axis of the ellipse is varied while the minor axis is inclined with respect to the normal direction at the contacting point of the chip member with the rotor, as shown in FIG. 23.
Figure 26B:
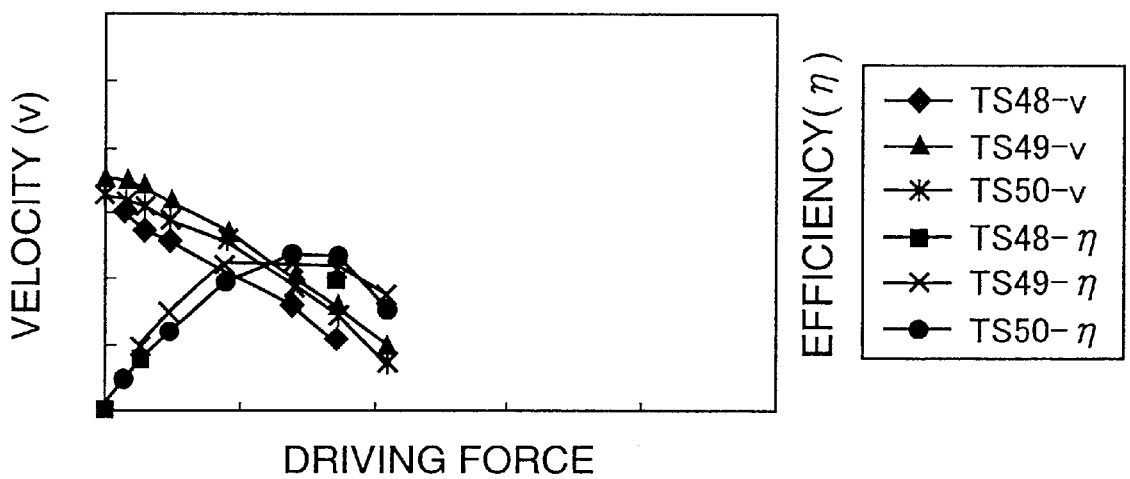
FIG. 26B is a graph for show relations between the rotation velocity of the rotor and the driving force of the actuator in the fifth embodiment when the actuator was driven in a manner that the trail of the chip member becomes elliptical and the minor axis of the ellipse is in the normal direction at the contacting point of the chip member with the rotor, as shown in FIG. 24.

FIG. 26A shows the relations between the rotation velocity of the rotor 40 and the driving force of the actuator in accordance with the fifth embodiment when the actuator was driven in a manner that the length of the minor axis of the ellipse is varied while the minor axis is inclined with respect to the normal direction at the contacting point of the chip member 20 with the rotor 40, as shown in FIG. 23. FIG. 26B shows the relations between the rotation velocity of the rotor 40 and the driving force of the actuator in accordance with the fifth embodiment when the actuator was driven in a manner that the trail of the chip member 20 becomes elliptical and the minor axis of the ellipse is in the normal direction at the contacting point of the chip member 20 with the rotor 40, that is the ellipse was not inclined, as shown in FIG. 24. In the FIGS. 26A and 26B, the symbols "TS48" and so on designate the driving conditions; the symbol "v" designates the rotation velocity of the rotor 40; and the symbol "η" designates the efficiency of the actuator.

In comparison with FIG. 26A and FIG. 26B, it was found that the output power and the efficiency of the actuator were increased by driving one piezoelectric device 10 or 10' in a manner so that the minor axis of the elliptical trail of the chip member 20 is inclined with respect to the normal direction at the contacting point of the chip member 20 with the rotor 40. Thus, it is preferable to control the phase difference and the amplitude of the driving signals of the actuator in there manner.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An actuator comprising:
   a base member;
   a plurality of displacing elements for generating a predetermined displacement, each displacing element having a top end and a base end with the top ends of the displacing elements being coupled at one point and base ends of the displacing elements being respectively fixed on the base member;
   a pressing member for contacting the coupled top ends of the displacing elements to a driven object with a predetermined pressure;
   a driving circuit for applying at least one driving signal to at least one displacing element; and
   a controller for controlling the driving signal so that the coupled top ends of the displacing elements moves for trailing an elliptical trail; wherein
   the driving signal applied to the at least one displacing element is fixed at a predetermined frequency, not controlled by the controller, and
   the controller controls the driving signal in a manner so that a shape of the elliptical trail of the coupled top ends of the displacing elements is varied.

2. The actuator in accordance with claim 1, wherein the controller controls a driving characteristic of the driven object by varying diameters of the elliptical trail of the driving member in a normal direction and a tangential direction at a contacting point of the driving member with the driven object.

3. The actuator in accordance with claim 2, wherein the controller controls a phase difference between at least two driving signals respectively applied to the displacing elements for varying the diameters of the elliptical trail of the driving member in a normal direction and a tangential direction at a contacting point of the driving member with the driven object.

4. The actuator in accordance with claim 2, wherein the controller controls amplitudes of at least two driving signals respectively applied to the displacing elements for varying the diameters of the elliptical trail of the driving member in a normal direction and a tangential direction at a contacting point of the driving member with the driven object.

5. The actuator in accordance with claim 2, wherein the controller drives the displacing elements in a manner enabling the coupled top ends of the displacing elements to move for trailing one of at least two elliptical trails, each of the at least two elliptical trails having a different elliptical shape, and the controller switches driving conditions of the displacing elements to select one of the elliptical trails corresponding to a desired velocity of the driven object.

6. The actuator in accordance with claim 5, wherein the controller selects an elliptical trail of the coupled top ends of the displacing elements by which a larger torque is outputted when the actuator starts up, and selects another elliptical trail by which a faster moving velocity of the driven object is obtained after a load of the actuator is reduced.

7. The actuator in accordance with claim 1, wherein the controller varies an inclination angle of a minor axis or a major axis of the elliptical trail of the coupled top ends of the displacing elements with respect to a normal direction at a contacting point of the driving member with the driven object.

8. The actuator in accordance with claim 7, wherein the controller varies an amplitude of at least one driving signal so as to vary the inclination angle.

9. The actuator in accordance with claim 7, wherein the controller varies an amplitude of at least one driving signal so as to vary the inclination angle corresponding to moving velocity of the driven object.

10. The actuator in accordance with claim 1, wherein the controller controls the driving characteristic of the driven object by varying a length of a minor axis of the elliptical trail of the coupled top ends of the displacing elements under a condition that the minor axis or a major axis of the elliptical trail is inclined with respect to a normal direction at a contacting point of the driving member with the driven object.

11. The actuator in accordance with claim 10, wherein the controller controls the length of the minor axis of the elliptical trail by varying an amplitude of at least one driving signal.

12. The actuator in accordance with claim 7, wherein the controller divides the plurality of displacing elements into a first group and a second group, and drives the first group by a first driving signal and the second group by a second driving signal, the first driving signal differs from the second driving signal by a drive signal characteristic other than phase difference between the first and second driving signals.

13. A driving method of an actuator having:
   a base member;
   a plurality of displacing elements for generating a predetermined displacement, each displacing element having a top end and a base end with the top ends of the displacing elements being coupled at one point and base ends of the displacing elements being respectively fixed on the base member; and a pressing member for contacting the coupled top ends of the displacing elements to a driven object with a predetermined pressure for transmitting a driving force to the driven object; wherein the displacing elements are driven in a manner so that the coupled top ends thereof moves for trailing an elliptical trail, and an inclination angle of a minor axis or a major axis of the elliptical trail with respect to a normal direction at a contacting point of the driving member with the driven object is varied.

14. The driving method in accordance with claim 13, wherein at least an amplitude of at least one driving signal applied to the displacing elements is controlled so as to vary the inclination angle of the minor axis or the major axis of the elliptical trail.

15. The driving method in accordance with claim 13, wherein an amplitude of at least one driving signal is controlled so as to vary the inclination angle corresponding to moving velocity of the driven object.

16. A driving method of an actuator having:

a base member;

a plurality of displacing elements for generating a predetermined displacement, each displacing element having a top end and a base end with the top ends of the displacing elements being coupled at one point and base ends of the displacing elements being respectively fixed on the base member; and a pressing member for contacting the coupled top ends of the displacing elements to a driven object with a predetermined pressure for transmitting a driving force to the driven object; wherein driving characteristic of the driven object is controlled by varying a length of a minor axis of the elliptical trail of the coupled top ends of the displacing elements under a condition that the minor axis or a major axis of the elliptical trail is inclined with respect to a normal direction at a contacting point of the driving member with the driving object.

17. The driving method in accordance with claim 16, wherein the length of the minor axis of the elliptical trail is controlled by varying an amplitude of at least one driving signal.

18. The driving method in accordance with claim 13, wherein the plurality of displacing elements are divided into a first group and a second group, and the first group is driven by a first driving signal and the second group is driven by a second driving signal, the first driving signal differs from the second driving signal by a drive signal characteristic other than phase difference between the first and second driving signals.

19. The driving method in accordance with claim 16, wherein the plurality of displacing elements are divided into a first group and a second group, and one of the first and second groups is driven while the other of the first and second groups is not driven.

20. A driving method of an actuator having: a base member; a plurality of displacing elements for generating a predetermined displacement, in which top ends of them are coupled at one point and base ends of them are respectively fixed on the base member; and a pressing member for contacting the coupled top ends of the displacing elements to a driven object with a predetermined pressure for transmitting a driving force to the driven object; wherein the plurality of the displacing elements are divided into a first group and a second group; and one of the first and second groups is driven in a manner to satisfy the following equations (A1) and (A2);

$$1 < fn_1/fn_2 < \{\alpha \pm (\alpha^2-1)^{1/2}\} \tag{A1}$$

$$\alpha = (1-2\ \zeta^2)/(1-4\ \zeta^4) \tag{A2}$$

hereupon, the symbol "$fn_1$" designates a resonance frequency in the same phase mode where the displacing elements contained in the first and second groups are expanded and contracted at the same phase; the symbol "$fn_2$" designates a resonance frequency in the opposite phase mode where the displacing elements contained in the first groups are expanded and contracted when the displacing elements contained in the second groups are contracted and expanded; and the symbol "$\zeta$" designates a damping ratio.

21. An actuator comprising: a base member; a plurality of displacing elements for generating a predetermined displacement, in which top ends of them are coupled at one point and base ends of them are respectively fixed on the base member, and divided into a first group and a second group; a pressing member for contacting the coupled top ends of the displacing elements to a driven object with a predetermined pressure for transmitting a driving force to the driven object; and a driving controller for driving the displacing elements included in the first and second groups in a manner so that the coupled top ends thereof moves for trailing an elliptical trail, and an inclination angle of a minor axis or a major axis of the elliptical trail with respect to a normal direction at a contacting point of the driving member with the driven object are varied; wherein the driving controller further comprises: a driving signal generator for generating two kinds of driving signals having a predetermined phase difference; two amplifiers respectively for amplifying the driving signals and for applying the driving signals to the displacing elements included in the first and second groups; a velocity sensor for sensing a moving velocity of the driven object; an amplitude controller for controlling an amplification factor of at least one amplifiers corresponding to a sensed result of the velocity sensor; and a phase difference controller for controlling the phase difference between the driving signals corresponding to the sensed result of the velocity sensor.

22. An actuator comprising: a base member; a plurality of displacing elements for generating a predetermined displacement, in which top ends of them are coupled at one point and base ends of them are respectively fixed on the base member, and divided into a first group and a second group; a pressing member for contacting the coupled top ends of the displacing elements to a driven object with a predetermined pressure for transmitting a driving force to the driven object; and a driving controller for driving the displacing elements included in the first and second groups in a manner so that the coupled top ends thereof moves for trailing an elliptical trail, and an inclination angle of a minor axis or a major axis of the elliptical trail with respect to a normal direction at a contacting point of the driving member with the driven object are varied by controlling an amplitude of at least one driving signal; wherein the driving controller further comprises: a driving signal generator for generating two kinds of driving signals having a predetermined phase difference; two amplifiers respectively for amplifying the driving signals and for applying the driving signals to the displacing elements included in the first and second groups; an amplitude controller for controlling an amplification factor of at least one amplifiers; a phase difference controller for controlling the phase difference between the driving signals; a memory for storing a plurality of driving patterns corresponding to elapsed time from the start-up of driving of the actuator; and a velocity controller for controlling at least one of the amplitude controller and the phase difference controller corresponding to the driving pattern when the elapsed time reaches to a predetermined time period.

23. An actuator comprising: a base member; a plurality of displacing elements for generating a predetermined displacement, in which top ends of them are coupled at one point and base ends of them are respectively fixed on the base member, and divided into a first group and a second group; a pressing member for contacting the coupled top ends of the displacing elements to a driven object with a predetermined pressure for transmitting a driving force to the driven object; and a driving controller for driving the displacing elements included in the first and second groups in a manner so that the coupled top ends thereof moves for trailing an elliptical trail, and an inclination angle of a minor axis or a major axis of the elliptical trail with respect to a normal direction at a contacting point of the driving member with the driven object are varied by controlling an amplitude of at least one driving signal; wherein the driving controller further comprises: a driving signal generator for generating two kinds of driving signals having a predetermined phase difference; two amplifiers respectively for amplifying the driving signals and for applying the driving signals to the displacing elements included in the first and second groups; an amplitude controller for controlling an amplification factor of at least one amplifiers; a phase difference controller for controlling the phase difference between the driving signals; a velocity sensor for sensing a moving velocity of the driven object; a memory for storing a plurality of driving patterns corresponding to the moving velocity of the driven object; and a velocity controller for controlling at least one of the amplitude controller and the phase difference controller corresponding to the driving pattern when the moving velocity of the driven object reaches to a predetermined velocity.

* * * * *